US010021757B2

(12) United States Patent
Coombes et al.

(10) Patent No.: US 10,021,757 B2
(45) Date of Patent: Jul. 10, 2018

(54) SYSTEM AND METHOD FOR PREDICTING EMERGENCY LIGHTING FIXTURE LIFE EXPECTANCY

(71) Applicant: Gooee Limited, St Albans (GB)

(72) Inventors: Simon Coombes, St Petersburg, FL (US); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/785,808

(22) Filed: Oct. 17, 2017

(65) Prior Publication Data

US 2018/0042083 A1 Feb. 8, 2018

Related U.S. Application Data

(63) Continuation-in-part of application No. 15/360,879, filed on Nov. 23, 2016, now Pat. No. 9,655,197.
(Continued)

(51) Int. Cl.
*H04L 29/08* (2006.01)
*H04W 4/02* (2018.01)
(Continued)

(52) U.S. Cl.
CPC ......... *H05B 33/0893* (2013.01); *H04L 67/10* (2013.01); *H04W 4/06* (2013.01);
(Continued)

(58) Field of Classification Search
CPC ............... H05B 33/08; H05B 33/0893; H05B 33/0845; H05B 33/0866; H05B 37/02;
(Continued)

(56) References Cited

U.S. PATENT DOCUMENTS 3,971,065 A 7/1976 Bayer
4,245,241 A 1/1981 Sato et al.
(Continued)

FOREIGN PATENT DOCUMENTS

CA 1315331 C 3/1993
CA 2594246 A1 1/2008
(Continued)

OTHER PUBLICATIONS

Lighting Research Center, Assist: Alliance for Solid-State Illumination Systems and Technologies, Feb. 15, 2005, 2 pages, http://www.lrc.rpi.edu/programs/solidstate/assist/index.asp.
(Continued)

*Primary Examiner* — Thai Pham
(74) *Attorney, Agent, or Firm* — Moyles IP, LLC

(57) ABSTRACT

Devices, systems, and methods for automatically managing emergency lighting testing are generally described herein. The automated emergency lighting testing may include scheduling emergency lighting events, verifying that emergency lighting power sources and fixtures are sufficient to maintain requisite light intensity for a requisite amount of time, and calculating life expectancy for emergency power sources and lighting fixtures to predict when components should be replaced to avoid failure. The disclosure reduces the amount of time and manual intervention required for the tests by using, among other things, a system of lighting control drivers, sensors, and processors that monitor, assess, and control the lighting system including emergency lighting components and power.

20 Claims, 16 Drawing Sheets

Related U.S. Application Data which is a continuation of application No. 15/424,868, filed on Feb. 5, 2017.

(60) Provisional application No. 62/521,817, filed on Jun. 19, 2017, provisional application No. 62/510,739, filed on May 24, 2017, provisional application No. 62/306,636, filed on Mar. 11, 2016, provisional application No. 62/445,669, filed on Jan. 12, 2017, provisional application No. 62/420,908, filed on Nov. 11, 2016.

(51) Int. Cl.
  *H05B 33/08* (2006.01)
  *H05B 37/02* (2006.01)
  *H04W 4/06* (2009.01)

(52) U.S. Cl.
  CPC ..... *H05B 33/0845* (2013.01); *H05B 33/0851* (2013.01); *H05B 33/0866* (2013.01); *H05B 37/0254* (2013.01); *H04W 4/023* (2013.01)

(58) Field of Classification Search
  CPC ............ H05B 37/0227; H05B 37/0272; H05B 37/0254; H04W 88/16; H04W 4/06; H04W 4/02; H04W 4/023; H04L 29/08; H04L 67/10
  See application file for complete search history.

(56) References Cited

U.S. PATENT DOCUMENTS

| | | | |
|---|---|---|---|
| 4,894,601 A | 1/1990 | Watkins | |
| 4,945,280 A | 7/1990 | Beghelli | |
| 5,154,504 A | 10/1992 | Helal et al. | |
| 5,770,928 A | 6/1998 | Chansky et al. | |
| 6,538,568 B2 | 3/2003 | Conley, III | |
| 7,045,964 B1 | 5/2006 | Hermans | |
| 7,248,297 B2 | 7/2007 | Catrysse et al. | |
| 7,777,427 B2 | 8/2010 | Stalker, III | |
| 7,893,632 B2 | 2/2011 | Meijer et al. | |
| 7,950,832 B2 | 5/2011 | Tanaka et al. | |
| 8,319,452 B1 | 11/2012 | Hamel et al. | |
| 8,442,785 B2 | 5/2013 | Walters et al. | |
| 8,643,304 B2 | 2/2014 | Hamel et al. | |
| 8,729,834 B1 | 5/2014 | Funderburk et al. | |
| 8,928,232 B2 | 1/2015 | Aggarwal et al. | |
| 9,084,308 B2 | 7/2015 | Morrow | |
| 9,131,581 B1 | 9/2015 | Hsia et al. | |
| 9,148,936 B2 | 9/2015 | Wagner et al. | |
| 9,277,632 B2 | 3/2016 | Hegarty | |
| 9,408,280 B2 | 8/2016 | Schröder et al. | |
| 9,521,733 B2 | 12/2016 | Brand et al. | |
| 9,655,197 B1 | 5/2017 | Coombes et al. | |
| 9,686,842 B1 | 6/2017 | Coombes et al. | |
| 2012/0139417 A1 | 6/2012 | Mironichev et al. | |
| 2013/0181636 A1 | 7/2013 | Agrawal | |
| 2013/0193876 A1* | 8/2013 | Cleland | H05B 37/0245 315/297 |
| 2013/0261774 A1* | 10/2013 | Lu | H04L 12/2807 700/90 |
| 2014/0097758 A1 | 4/2014 | Recker et al. | |
| 2014/0320022 A1 | 10/2014 | Lee | |
| 2014/0375221 A1 | 12/2014 | Mans et al. | |
| 2015/0130365 A1 | 5/2015 | Kim et al. | |
| 2016/0014867 A1 | 1/2016 | Luk | |
| 2016/0036268 A1 | 2/2016 | Laherty et al. | |
| 2016/0088711 A1 | 3/2016 | Ng et al. | |
| 2016/0302273 A1 | 10/2016 | Wee et al. | |
| 2016/0360594 A1* | 12/2016 | Chemel | H05B 37/0227 |
| 2017/0111979 A1 | 4/2017 | Barna et al. | |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102007043416 A1 | 4/2009 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2222245 A | 2/1990 |
| GB | 2359616 A | 8/2001 |
| GB | 2380620 A | 4/2003 |
| GB | 2489505 A | 10/2012 |
| GB | 2494151 A | 3/2013 |
| GB | 2534901 A | 8/2016 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.
Philips, Understanding power LED Lifetime analysis, Technology White Paper, Dec. 5, 2016, 11 pages, www.lrc.rpi.edu/programs/solidstate/assist/index.asp.
Kevin Dowling, PhD, Lumen Maintenance IESNA LM-80/2008, Oct. 30, 2008, 16 pages, www1.eere.energy.gov/buildings/publications/pdfs/ssl/lm80-webcast 10-30-08.pdf.
Jeff McCullough, LC, Pacific NW National Lab, Energy Star® Webinar:Requirements for Lumen Maintenance, Oct. 30, 2008, 18 pages, www1.eere.energy.gov/buildings/publications/pdf.
M-CAM Patently Obvious, Kodak's Final Gasp? Intellectual Property Analysis of Kodak v Apple, HTC, Jan. 13, 2012, 8 pages, http://www.globalinnovationcommons.org.
Claire Swedberg, IoT Lights Up Streets With Smart City Initiative, RFiD Journal, Jul. 23, 2015, 3 pages, http://www.iotjournal.com/articles/view?13303.
Dali, Discover Dali—Excellent System Performance, Mar. 31, 2014, 5 pages, http://dali-ag.org/discover-dali.html.
International Search Report and Written Opinion of International Application No. PCT/IB2017/051390, dated May 31, 2017,13 pgs.
International Search Report and Written Opinion of International Application No. PCT/IB2017/051386, dated Jun. 6, 2017, 12 pgs.
UK Examination Report of United Kingdom Patent Application No. GB1718616.4, which is in the same family as U.S. Appl. No. 15/785,808, dated Jan. 10, 2018, 7 pgs.
International Search Report of International Application No. PCT/IB2017/057046, which is in the same family as U.S. Appl. No. 15/785,808, dated Feb. 12, 2018, 3 pgs.
International Written Opinion of International Application No. PCT/IB2017/057046, which is in the same family as U.S. Appl. No. 15/785,808, dated Feb. 12, 2018, 8 pgs.

* cited by examiner

SYSTEM AND METHOD FOR PREDICTING EMERGENCY LIGHTING FIXTURE LIFE EXPECTANCY

CROSS REFERENCE TO RELATED APPLICATIONS

This application is a continuation-in-part of and claims priority to U.S. patent application Ser. No. 15/360,879 filed Nov. 23, 2016, now U.S. Pat. No. 9,655,197, which claims the benefit of U.S. Provisional Patent Application Ser. No. 62/306,636 filed Mar. 11, 2016 and is a continuation-in-part of and claims priority to U.S. patent application Ser. No. 15/424,868 filed Feb. 5, 2017, which claims the benefit of U.S. Provisional Patent Application Ser. No. 62/445,669 filed Jan. 12, 2017. This application also claims the benefit of U.S. Provisional Application Ser. No. 62/510,739 filed May 24, 2017, U.S. Provisional Application Ser. No. 62/521,817 filed Jun. 19, 2017, and U.S. Provisional Application Ser. No. 62/420,908 filed Nov. 11, 2016. The disclosures of each application listed above are incorporated herein by reference in their entirety.

FIELD OF THE DISCLOSURE

Devices, systems, and methods for managing emergency lighting are generally described. In particular, automated systems and methods for testing and managing emergency lighting to ensure sufficient intensity and duration of the emergency lighting according to safety requirements are disclosed. Further, devices, systems, and methods for predicting life expectancy of emergency lighting systems are disclosed.

BACKGROUND OF THE DISCLOSURE

There is a need to provide emergency lighting in lighted spaces, especially commercial buildings, in the event of a main power outage. Emergency lighting systems must provide light of sufficient intensity and for a sufficient duration to meet safety standards and operators must test emergency lighting systems to ensure compliance. Known test procedures for emergency lighting systems are manual, where a maintenance engineer visits the site periodically to physically cut the power in order for the backup power supply to the lighting system, such as a battery, to take over the powering of the emergency fixtures to ensure the fixtures light up and last for the minimum required amount of time. The current manual method is very laborious and therefore costly to maintain.

Digital Addressable Lighting Interface (DALI®) is one known, standard lighting protocol for emergency testing. The test procedure is done via scheduling or manually at the local control panel so that a maintenance engineer may be present on site to supervise and confirm compliance. In countries such as the United Kingdom (UK), the emergency lighting has to perform with minimum lux levels for a set length of time. The test procedure is designed to last the minimum time, i.e., 3 hours for the UK, and when finished the retrievable data is simply pass/fail and a visual confirmation that emergency lighting is sufficient.

Examples of known emergency backup lighting systems are locally maintained and non-maintained battery backup fixtures, where both require a constant live feed to ensure the batteries can be charged. A maintained fixture has a switched feed to allow the light to be controlled without switching to emergency battery mode and an emergency luminaire that remains lit even when the system is not in emergency mode. A non-maintained emergency luminaire is a luminaire whose lamps only come on when the power supply to the lighting fails. Another example of a known emergency backup lighting system is a centralized battery system, which replaces the main feed to the lighting system circuits in the event of main power outage.

The performance of the emergency fixtures in the event of a main power outage is currently ensured by standardized test procedures (for example, monthly and annual tests) carried out and validated by, for example, a maintenance engineer who signs-off on the procedure. These emergency tests require extensive human interaction with the system such as monthly appointments to cut the power to the main unswitched supply to each circuit, check all the emergency lights, and sign a register that the test was carried out and all emergency lights worked according to requirements. Further, the test will occupy the maintenance engineer for at least the required time of the test, e.g., 3 hours in the UK.

For at least the above reasons, there is a need for an automated system and method for testing and managing emergency lighting. Further, there is a need for an automated system and method for predicting life expectancy of an emergency lighting system including, among other things, a luminaire, LED, and backup power supply.

BRIEF DESCRIPTION OF THE EXEMPLARY EMBODIMENTS

This disclosure relates to automated devices, systems, and methods for predicting life expectancy of emergency lighting fixtures in lighting systems. In particular, the disclosure relates to an automated system and method for predicting life expectancy of emergency lighting power sources such as batteries for luminaires. These emergency systems must be able to provide a requisite amount of light for a requisite amount of time to comply with emergency lighting regulations. The exemplary disclosed embodiments provide devices, systems, and methods that integrate emergency testing procedures into overall automation controls for lighting systems, automatically determine and test emergency lighting systems at optimal times, and dynamically maximize performance of emergency lighting systems.

The disclosure also relates to predicting life expectancy of a luminaire, LED, combined luminaire and/or LED, luminaire driver, and/or LED driver. For purposes of this disclosure, an electronic driver (or, simply "driver") for a luminaire/LED is generally one or more components configured to control, for example and without limitation, the power supply, dimming level, and/or other operations of the luminaire/LED as described in the disclosure and known in the art. In the exemplary disclosed embodiments, a driver is a dimming control.

In an exemplary embodiment, the system may include at least one of a plurality of luminaires and/or a plurality of LEDs configured to communicate with at least one gateway, at least one sensor subsystem configured to sense a plurality of color channels and monitor at least one change in environment in real time, at least one power meter configured to measure power in real time, and at least one server. Each of the plurality of luminaires and/or LEDs includes at least one driver and/or LED driver. For purposes of this disclosure, "real time" generally means substantial concurrency but does not imply any particular timeframe or limitation. An "environment" generally refers to, for example and without limitation, a room, corridor, or any other space in which the disclosed luminaires and associated systems may be installed.

With continuing reference to certain exemplary embodiments, each of the plurality of luminaires and/or LEDs has an inbuilt or external (collectively, i.e., "emergency") power source. In certain embodiments the power source includes rechargeable batteries. In the same or other embodiments, the emergency power source may be non-rechargeable batteries, an external generator, or any other emergency power source consistent with the spirit and scope of this disclosure. The disclosed systems and methods relate generally, among other things, to predicting the emergency lighting fixture life expectancy. An exemplary system comprises a gateway configured to control illumination of a luminaire including an emergency power source, a sensor subsystem configured to measure data regarding at least light intensity of the luminaire and parameters of an environment in which the luminaire (and/or other associated components) are installed, and a server configured to communicate data with the gateway and process information from the sensors and other components. The gateway is generally configured to turn off a main power supply to the luminaire to initiate illumination of the luminaire via the emergency power source and thereby conduct a test to determine whether the emergency power source is capable of powering the luminaire at a requisite light intensity for a requisite duration during emergency operation. The sensor subsystem measures the light intensity of the luminaire at various power levels as the emergency power source discharges during the test. As the power source depletes, so eventually does the light intensity from the luminaire; however, the degree and effect of the power depletion on light intensity may vary according to, among other things, the type of luminaire/LED, the type of emergency power source, and environmental conditions. An exemplary server is configured to use the depreciation data to calculate whether any particular emergency power source is capable of powering any particular emergency lighting system at the requisite intensity for the requisite time. The server is also capable of calculating a depreciation curve of light intensity versus time and/or power output from the emergency power source and predicting an end of life for either or both of the emergency power source and LED (and/or driver), based on depreciation data compiled over several emergency operation test runs.

In other aspects of the disclosed exemplary embodiments, the server may further calculate a dimming level or dimming control protocol for the luminaire(s) at which the emergency power source will be capable of maintaining a requisite light intensity for the requisite time. The server can communicate these dimming control instructions to the gateway, which may in turn implement the dimming instructions directly or via the dimming control (driver) to the luminaire.

In further aspects of the disclosed exemplary embodiments, an emergency lighting operation test allows the emergency power source to fully discharge. The exemplary disclosed systems and methods measure data related to the depreciation of light intensity during the entire discharge to generate correlations between the full range of power levels and light intensity. Similarly, in the same or other embodiments and/or tests, light intensity is measured against power consumption from the emergency power source in real time to develop correlation(s) between those factors.

In additional aspects, the disclosed devices, systems, and methods may include environment sensors that face away or in a downward direction from the luminaires to measure data regarding parameters including, for example and without limitation, temperature, humidity, ambient light, motion of objects, etc., of an environment in which the luminaire(s) is installed. In one aspect, an environment sensor may measure "footfall", i.e., the number of people passing through the environment. The exemplary systems and methods may use these footfall measurements to generate an emergency lighting test schedule when the footfall is at zero or an observed minimum, for example, when no, or the fewest number of people are sensed in the environment. That is, the system is capable of measuring footfall at all times of the day/week/etc., and calculating or identifying a time of the day/week/etc. when the footfall is most likely to be at either zero or its lowest point based on the measured footfall. Emergency lighting tests are typically performed when the fewest number of people are in the relevant environment, thereby minimizing inconvenience and/or the chance of having to abort a test because a person has wandered into an insufficiently lit area.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which.

Figure 1:
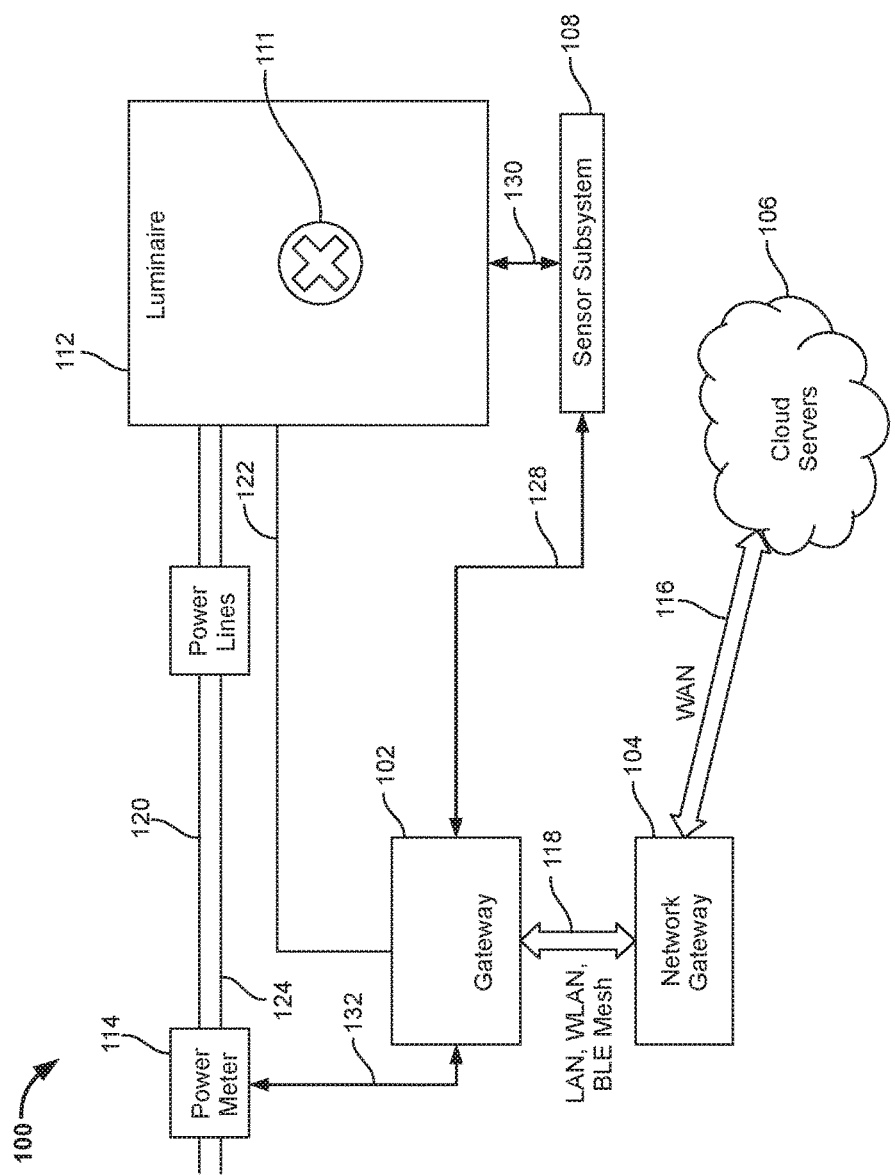
FIG. 1 illustrates a high-level system diagram of the gateway without dimming control protocol, according to an aspect.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Embodiments of the present disclosure relate generally to devices, systems, and methods for identifying lumen depreciation over time and in particular in emergency lighting luminaires with emergency power sources. The system and method may predict life expectancy of a plurality of lighting devices and emergency power sources. Additionally, they predict lumen degradation which facilitates automated maintenance of lighting devices by the manufacturer/user/customer. Embodiments of the present disclosure will be illustrated below in conjunction with the figures. Each of the phrases "devices", "systems", and "methods" is inclusive of the others and does not limit the disclosed subject matter.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Further, while reference is made to various types of databases, it will be understood by one of ordinary skill in the art that all of the database functions may be stored within compartments of a single database, or within individual databases. In any event, the disclosure is considered to include a tangible storage medium or distribution medium and known equivalents and successor media, in which the software implementations of the present disclosure are stored.

According to an aspect and with reference to FIG. 1, a system 100 for predicting life expectancy of emergency lighting fixtures is described. In an embodiment, the system may include at least one luminaire 112 and/or at least one Light Emitting Diode (LED) 111 configured to communicate with at least one gateway 102, at least one sensor subsystem 108 configured to sense a plurality of color channels and monitor at least one change in environment in real time, at least one power meter 114 configured to measure a main power source/supply in real time, and at least one server 106. Each luminaire 112 and/or LED 111 has an inbuilt 140 (i.e., part of the luminaire 112 and/or LED 111 mechanical structure) or external power source 141 for emergency operation. In an exemplary embodiment the emergency power source may include at least one inbuilt, rechargeable battery in the luminaire 112. Other emergency power sources may include generators, backup power feeds, or other known power sources. The at least one sensor subsystem 108 and the at least one power meter 114 may each be connected with the at least one gateway 102 along with each luminaire 112. The at least one sensor subsystem 108 includes at least two sensors or sets of sensors in an exemplary embodiment. A first sensor or set of sensors includes environment sensors arranged to face away from and/or extend in a downward direction from the luminaire 112. A second sensor or set of sensors includes a color sensor, for example and without limitation an RGB sensor, arranged to face the luminaire directly.

According to an aspect, the at least one server 106 is configured to calculate and predict life expectancy of the emergency lighting power source and other components such as the luminaire driver, LED, and/or LED driver based on data from the sensor subsystem 108 as described further below. In the exemplary disclosed embodiments, the sensor subsystem 108 is configured to transmit and update status information associated with the at least one luminaire 112. For example, the at least one sensor subsystem 108 measures light intensity from the luminaire 112 and data regarding dynamic environmental conditions in real time.

In the exemplary embodiment shown in FIG. 1, the at least one server 106 is connected with the gateway 102 via a wireless connection. In the same or other embodiments the connection may be wholly or in-part physically wired. Emergency lighting fixtures, which may constitute the at least one luminaire 112 itself, or other maintained or non-maintained luminaires (described further below), and associated components are configured to communicate with the at least one server via the gateway 102. In an exemplary aspect, the luminaire 112 and/or LED 111 act as emergency lighting fixtures when the main power to the luminaire 112 and/or LED is off.

In various embodiments, the luminaire 112 is a system that may include a single luminaire or multiple luminaires connected with a single common interface to power lines 120, 124. According to an aspect of the exemplary embodiment shown in FIG. 1, a power meter 114 may be electrically connected respectively between the gateway 102 and the luminaire 112 via power meter interface 132 and power lines 120, 124. The power meter 114 may be connected to an input line of the luminaire 112 in such a way that the power meter 114 measures electrical power drawn by the luminaire 112 in real time via known techniques for measuring power consumption. The power meter 114 may provide the real time power measurements to the gateway 102. The interface 132 between the gateway 102 and the power meter 114 may be a Universal Asynchronous Receiver/Transmitter (UART) or other communication interface ("power meter interface") as known in the art. The power lines 120, 124 between the power meter 114 and the luminaire 112 may depend on the type of power meter 114 being used and are also known in the art.

As illustrated in FIG. 1 and according to an aspect, the system 100 including the at least one sensor subsystem 108 detects information related to the system 100 and the luminaire 112 by detecting a current condition of the luminaire 112. For example, the sensor subsystem 108 may include at least a first sensor to measure a color (i.e., light) intensity of the luminaire and a second sensor to measure at least one aspect of the environment in which the luminaire is installed. The information from the sensor subsystem 108 is transmitted to the server 106 for, among other things, use in predicting life expectancy of the emergency lighting fixtures. Thus, the system 100 includes at least one gateway 102, which in an embodiment is a protocol agnostic gateway and/or a Universal Smart Lighting Gateway (USLG) to forward the information from the luminaire 112, sensor subsystem 108, and gateway 102 to the server 106.

As an example related to the exemplary embodiment shown in FIG. 1, parameters of the luminaire 112 and/or environment, such as the color levels and/or intensity, light intensity, power consumption, temperature, humidity, etc., is relayed to the gateway 102 and then to the server 106 for storage and processing. The sensor subsystem 108 is connected to the luminaire 112 via connection 130 and to the gateway 102 via a sensor interface 128. According to an aspect, the connection 130 and sensor interface 128 may be physical or wireless. The location of the sensor subsystem 108 on the luminaire 112 depends at least in part on the shape of the luminaire 112 as discussed with respect to FIG. 3.

The gateway 102 is capable of communicating with and coordinating one or more sensor subsystems 108 including sensor protocols such as scheduling readings, via its sensor interface 128. Embodiments in accordance with this disclosure do not limit the type of hardware/wire/bus interfaces or wireless protocols between the gateway 102 and the sensor subsystem 108. The physical connections can be analog interface connectors and/or electrical/digital bus connectors of any kind consistent with this disclosure.

At least one color sensor of the sensor subsystem 108 may detect and measure one or more color channels of the luminaire 112, including, e.g., color content, levels, and intensity, by directly facing the luminaire 112. For purposes of this disclosure, a "color sensor" is a sensor that directly faces the luminaire and measures an aspect of color or light therefrom. The color sensor can be based on a single color or a plurality of colors.

In addition, at least one environment sensor of the sensor subsystem 108 measures one or more conditions of the environment in which the luminaire 112 is installed. The environment sensor may be a low resolution imaging sensor which could be an array of sensors combined into a low resolution imaging device, or a single application-specific integrated circuit (ASIC) that is an imaging sensor. In an exemplary aspect, the environment sensor may include three or more different sensors, such as a low-resolution image sensor, an ambient light sensor, and a temperature sensor. Further embodiments in accordance with this disclosure can use any number of known sensors depending on the particular application of the sensors within the spirit and scope of the disclosure. For purposes of this disclosure, an "environment sensor" refers singularly or collectively to one or more sensors that measure one or more conditions of the environment in which the luminaire 112 is installed.

According to an aspect, the combination of the environment sensor and the color sensor may be set into one of a single ASIC or a set of separate devices, all of which are also connected to the gateway 102. The sensors may be generally directed as follows: the color sensor faces the luminaire 112 directly to measure aspects of the light therefrom, and the environment sensor faces away or in a downward direction from the luminaire 112 to monitor the environment independent of the luminaire 112. Each of the sensors in an exemplary sensor subsystem 108 is capable of making real time measurements and transmitting them to the gateway 102.

Exemplary embodiments in accordance with this disclosure include a color sensor that provides continuous measurements of a plurality of color channels from the luminaire 112 and/or LED 111. In one embodiment, these color channels can be Blue, Yellow and Green channels. In another embodiment the color channels are Red, Green and Blue channels. These measurements may be specific to the color sensor and its design, such that different color sensors may provide different color intensity readings, yet the sensor readings will depreciate at the same rate relative to the color sensor.

For example, the process of calibration of the color sensor is such that the depreciation of a sensor follows a known graph for the specific color sensor complementary metal-oxide-semiconductor (CMOS). In an embodiment, the sensor readings are normalized by its previous readings, such that only the normalized change in reading is significant. Color sensors do not differ from one another in any significant way after normalization of the readings; e.g., if we take two different color sensors' CMOS that are attached to the same luminaire in different physical attachment locations on the luminaire fitting, we may expect to receive different absolute Red, Green, Blue, and Yellow intensity readings when compared between the two sensors, due to the different amount and intensity of light received at the two physical locations. However, the normalized values read by each individual sensor of the percent (%) change in color intensity will have a very close, negligible difference. For instance, we may read Red intensity at time t1 respectively as x1 and y1 for each sensor. At t2, we read x2 and y2 respectively. Then $x2/x1=y2/y1+w$ where $w\ll1$ (for example, where w is very small). Embodiments in accordance with this disclosure thus allow for an exponential relationship between color intensity measurements and lumen intensity of the LED. This relationship is known/calculated by the server 106 in the exemplary disclosed methods.

In the exemplary disclosed embodiments, the system includes the Red, Green, Blue (RGB) color sensor directly facing the luminaire 112. The RGB sensor may measure both the RGB content of a light source and the color/RGB intensity of the light source. Thus, the RGB sensor (or, up looking sensor) is capable of measuring, e.g., color content, level, and intensity of different luminaire models from the same or different manufacturers, and regardless of inherent differences between the same types of luminaires, which emit different light intensity.

In the exemplary emergency lighting test using the system(s) shown in FIG. 1 (and FIG. 1A (discussed further below)), the gateway 102 may automatically cut off the main power to the one or more luminaires 112 and/or LEDs 111 by hardware or software implementation. The hardware implementation of the test is done through at least one timer and sensed data. The emergency power source, such as the one or more rechargeable batteries in the exemplary disclosed embodiments, are initiated to power the emergency lighting fixtures and an end of life expectancy for the rechargeable batteries is determined by performing a plurality of tests described further below. For example, as described further below, the tests are performed to determine the charging and discharging time of the rechargeable batteries and also to determine the maximum lifetime of the rechargeable batteries. Based on the test, the system can automatically verify whether the rechargeable batteries could be activated to power the luminaires 112 and/or LEDs 111 to act as emergency lighting fixtures and when the batteries may need replacement.

In an aspect, the exemplary disclosed emergency lighting tests may be performed during installation or commissioning of the lighting system, including the emergency power systems. Performing the test upon commissioning verifies that the emergency power sources will power the emergency lighting fixtures at the requisite light intensity for the requisite period of time. Further, data regarding predictive degradation and end of life expectancy for the emergency power sources (e.g., rechargeable batteries) may also be determined according to the disclosure at this initial stage to provide additional and/or baseline data for future calculations.

In another aspect of the disclosed systems and methods, the lighting system can perform "smart" tests of the emergency lighting system. For example, the server 106 may use historical information from the sensor subsystem 108 to determine a correlation between the degradation of light intensity from a luminaire 112 and the corresponding power level of the emergency power source to determine an appropriate, general testing schedule for the emergency power source. The server may then determine a specific day/time for the test based on changes in power level readings and/or historical information about when a relative minimum footfall occurs in the environment in which the luminaire 112 is installed—i.e., when zero or a minimum number of people (as observed by sensor subsystem 108) are typically present in the environment. Thus, the test may be automatically scheduled and performed when a minimum number of people would presumably be in or passing through the environment.

Figure 1A:
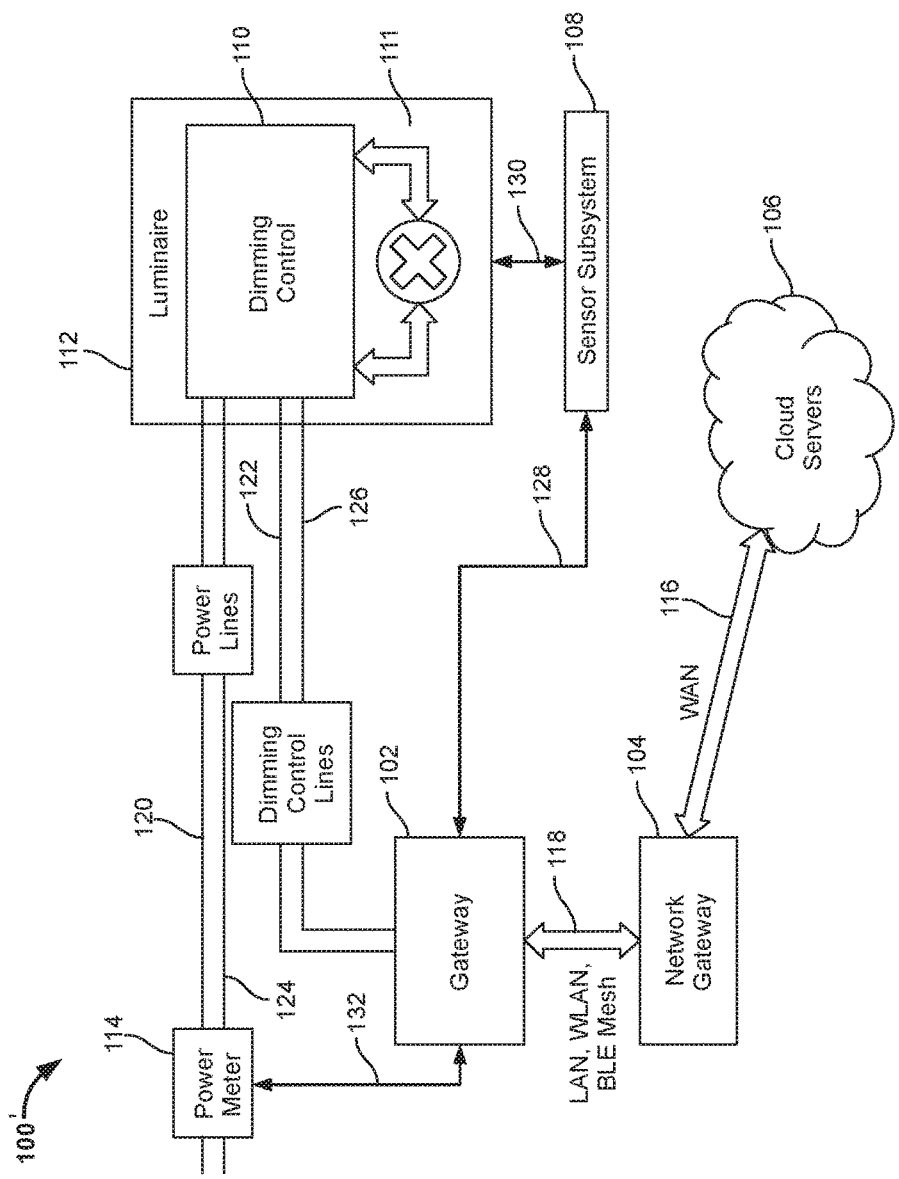
FIG. 1A illustrates a high-level system diagram of the gateway with dimming control protocol, according to an aspect.

With reference now to the exemplary embodiment shown in FIG. 1A, the system 100' may include at least one luminaire 112 and/or LED 111 configured to communicate with at least one gateway 102, at least one sensor subsystem 108 configured to sense a plurality of color channels and monitor at least one change in environment in real time, at least one power meter 114 configured to measure a main power source/supply in real time, at least one dimming control protocol, device, driver, and/or interface 110 installed in one or a plurality of lighting devices for controlling dimming levels of the lighting device(s), and at least one server 106. As previously discussed, the exemplary disclosed system may comprise one or more luminaires 112 and/or LEDs 111 associated with a single gateway 102 and/or other system components via common connections or may refer to any configuration of one or more system components and connections adapted to particular applications. The dimming control 110 for one or more luminaires 112/LEDs 111 in the exemplary embodiment shown in FIG. 1A may communicate with gateway 102 via common dimming control lines 122, 126 which form a dimming control closed circuit with the gateway 102 through which, e.g., dimming instructions and protocols may be sent to the luminaire 112/LED 111 and the current dimming level may be communicated to the gateway 102. In other embodiments, any number of dimming control lines may be used (and may be wired or wireless communication connections) to accommodate the number and/or type of dimming controls present.

Each luminaire 112 and/or LED 111 includes at least one driver and/or LED driver. Further, each luminaire 112 and/or LED 111 has either an inbuilt 140 or external 141 emergency power source. In the exemplary disclosed embodiments, the power source includes inbuilt rechargeable batteries. The at least one sensor subsystem 108 and the at least one power meter 114 may each be connected with the at least one gateway 102 along with the luminaire 112. The at least one sensor subsystem 108 includes at least two sets of one or more sensors in the exemplary disclosed embodiments. A first sensor or set of sensors includes at least one environment sensor dedicated to environment sensing as described above, and may be arranged such that it faces away from and/or extends in a downwardly fashion from the luminaire 112. A second set of sensors or a single sensor includes at least one color sensor/RGB sensor arranged such that it faces the luminaire 112 directly to measure at least one of color content, level, and intensity emitted by the luminaire 112 and/or LED 111. The sensor subsystem 108 may sense and capture data in real time and transmit the data to the server 106 via gateway 102 during operation of the lighting system using the main power supply. In the exemplary embodiment shown in FIG. 1A, the at least one server 106 is connected with the gateway 102 via at least one of a wired connection and a wireless connection and the gateway 102 is configured to, among other things, transmit data to the server 106 and receive controlling instructions from the server 106. The gateway 102 is further capable of discovering a dimming control protocol for each luminaire 112 and controlling the dimming level of each luminaire 112 either directly or based on instructions from the server 106. In addition, the gateway 102 is capable of controlling the power to the luminaire 112 including dimming the luminaire 112 to zero (0) brightness or shutting it off completely. According to an aspect, the at least one server 106 is configured to calculate and predict depreciation of the dimming levels of each luminaire 112 and/or LED 111 based on information from the sensor subsystem 108, as discussed in detail further below. The gateway 102 and sensor subsystem 108 may be configured to continuously or periodically report and change status information associated with each luminaire 112 including, e.g., dimming level, light intensity, ambient light and/or temperature conditions, etc.

The at least one sensor subsystem 108 and the at least one power meter 114 may each be connected with the at least one gateway 102 to provide sensor and/or power information in real time. Each luminaire 112 and/or LED 111 is physically or wirelessly connected to the gateway 102 via at least one dimming control interface. In an aspect, one or a plurality of luminaires 112 and/or LEDs 111 act as emergency lighting fixtures when the main power to the luminaires 112 and/or LEDs is OFF.

The gateway 102 may further be capable of detecting, communicating, and handling/controlling a plurality of dimming protocols via the dimming control 110, and/or to directly control the dimming control 110 to set a dimming level for the luminaire 112. The gateway 102 is configured to receive and/or transmit information related to the current dimming level of each luminaire 112 between the luminaire and the server 106. The dimming protocols include, but are not limited to, 0V-10V, 1V-10V, DALI®, and Digital Multiplex (DMX). According to an aspect, both wired and wireless, and digital and analog protocols and interfaces are included. Embodiments in accordance with the present disclosure do not limit the type of hardware/wire/bus interfaces or wireless communications protocols between the gateway 102 and the dimming control 110, e.g., the number of wires, the type of wires or bus connectors. The dimming control line 122, 126 connection may be analog interface control wires and/or electrical/digital bus connectors, of any kind.

Embodiments in accordance with the present disclosure provide the system 100' in which the gateway 102 can control the dimming control 110 and change the dimming level and/or the color temperature of the luminaire 112 (in luminaire devices that allow for color temperature controls). In an exemplary embodiment, the gateway 102 receives a set of directives or instructions from the server 106 or a user for dimming setup and sensor measurements to occur at a specific day and time and/or on a specific schedule that repeats itself. Such information may be stored in a scheduling database. (See, for instance, FIG. 5 regarding the Dimming and Testing Schedule Database 524.) The scheduling database 524 is a database for storing a time schedule for conducting the detecting of information, e.g., via sensor subsystem 108. For example, the server 106 may access the scheduling database 524 and transmit a scheduling message to record the current dimming level and detect the current conditions of the luminaires 112 by the sensor subsystem 108. In the same or other embodiments, the sensors of the sensor subsystem 108 can be programmed via the gateway 102 such that they will provide event data only in cases where a parameter such as color intensity is outside a predefined range. Similarly, the gateway 102 may be controlled by the server 106 such that it instructs the sensor subsystem 108 to execute measurements, or transmits the results of measurements to the server 106, only when sensor measurements and/or dimming levels are in a certain range. According to an aspect of the exemplary embodiments, the dimming parameters, environmental reading parameters, color (up looking) sensor parameters, and reading scheduling are all controlled from outside of the gateway 102 via cloud servers 106 connecting to the gateway 102 via backhaul interface 118. The system thus provides a discrete circuit for automatically monitoring and controlling aspects of illumination, such as color content, temperature, and intensity of the luminaire 112 and/or LED.

In the exemplary embodiments, the up looking sensor is a Red Green Blue (RGB) sensor directly facing the luminaire 112. The RGB sensor may measure, among other things, the RGB content of a light source (such as LED 111) and the color/RGB intensity of the light source. The up looking RGB allows the illumination properties, such as light intensity, of each luminaire 112 to be uniquely measured, because different brands or types of luminaires, or even different units of the same luminaire, may emit different intensities of light that may not be individually known from a measurement of overall illumination of a space. Each up looking RGB sensor may then send the illumination data to the at least one gateway 102 for eventual transmission to the server 106 and/or processing in accordance with the functions described herein.

In an exemplary embodiment of an emergency lighting testing procedure, the system automatically cuts off the main power to the plurality of luminaires 112 and/or the plurality of LEDs 111 through the at least one gateway 102 by software implementation, thus initiating illumination of the emergency lighting via an emergency power source such as rechargeable batteries in the respective emergency lighting fixtures (in the exemplary embodiments, luminaires 112 and/or LEDs 111). The ability of the emergency power source to power the luminaires 112 and/or LEDs 111 at a requisite light intensity for a requisite period of time is checked and data is gathered, e.g., through sensor subsystem 108, to calculate an end of life expectancy for the emergency power source, luminaire 112 and/or luminaire driver, and/or LED 111 and/or LED driver, as described further below. In the exemplary case of rechargeable batteries, the discharge time of the rechargeable batteries is monitored to determine (1) when the power level of the rechargeable batteries reaches a point where it is no longer sufficient to achieve the requisite light intensity and/or (2) the full discharge time of the rechargeable batteries. Based on such tests, the system may automatically verify whether the plurality of rechargeable batteries could be activated to power the plurality of luminaires 112 and/or the plurality of LEDs 111 (or other emergency lighting fixtures) to act as emergency lighting fixtures.

Figure 2:
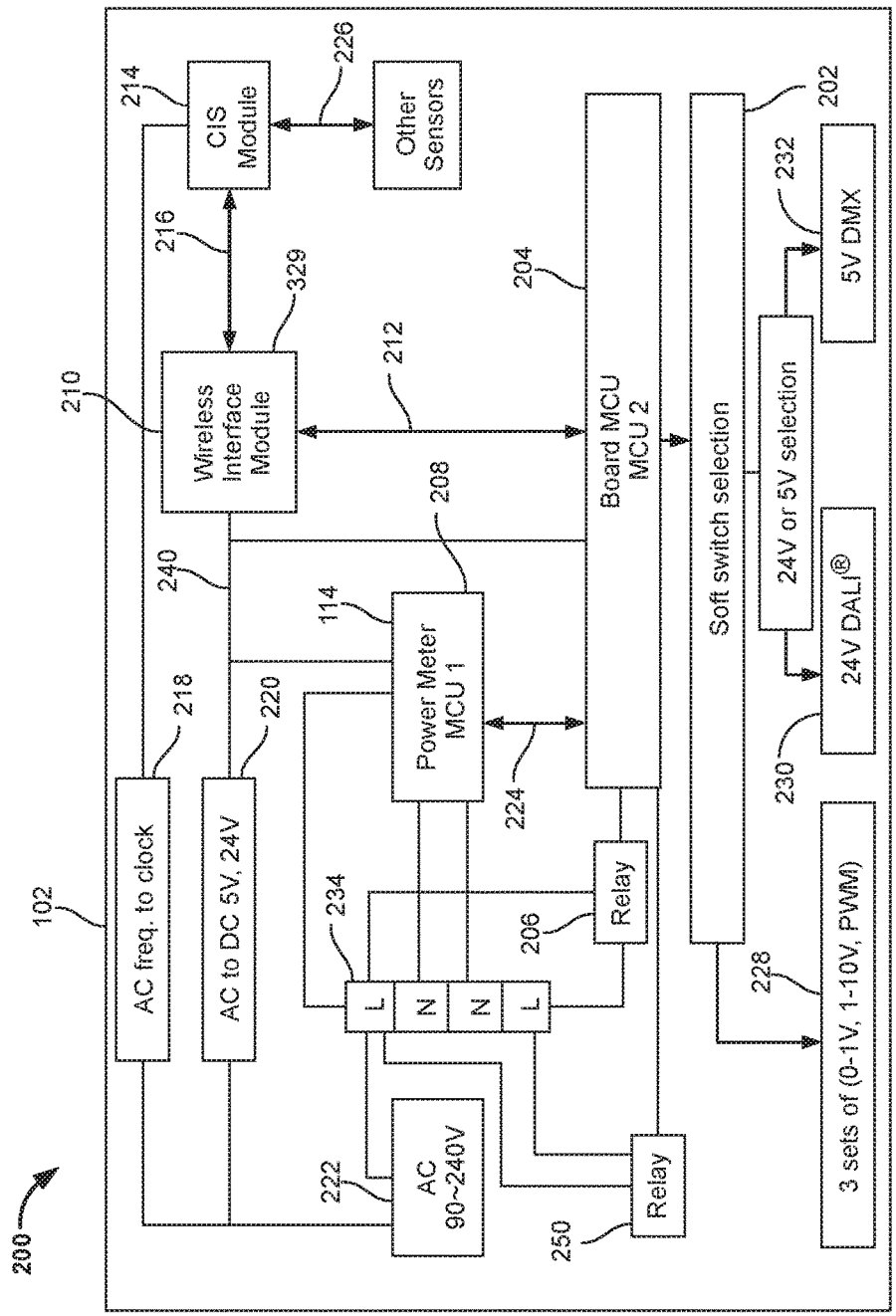
FIG. 2 illustrates a gateway box diagram, according to an aspect.

In the same or other exemplary embodiments of the test procedure, cutting off, turning off, or otherwise disconnecting power from the plurality of luminaires 112 and/or the plurality of LEDs 111 through the at least one gateway 102 is done by hardware implementation. Said hardware implementation is done through at least one timer, at least one relay switch 250 as shown in FIG. 2, and sensed data, according to known techniques and components for controlling the lighting system power.

In an aspect, the dimming control 110 communicates with other components of the system, such as the server 106, via the gateway 102 to enact the test procedures to predict emergency power source life expectancy. As described further below, the dimming control 110 provides another control variable that may be used to increase or decrease the life expectancy of the emergency power source; for example, a requisite light intensity may be achievable at a higher dimming level that requires less power output to maintain from the emergency power source. In any event, in the exemplary disclosed embodiments the up looking color sensor measures and transmits data regarding the light intensity (among other things) provided by the luminaire 112 during emergency operation. The light intensity is continuously or periodically measured to verify that there is requisite light and the associated light intensity, and that information can later be compared to the light intensity reading at the same point in time from previous tests to calculate a predictive curve for the emergency power source, such as failure of one or more rechargeable batteries. In a system including a luminaire 112 with dimming control 110, the predictive curve for the failure of the rechargeable batteries may also be based in part on the number of cycles the rechargeable batteries have been charged as well as environmental conditions, such as ambient temperature, which may both affect the observed light intensity at the same dimming level of the luminaire 112 as between successive tests. In another aspect of the testing, the system may run the test until one of more of the batteries completely discharge and calculate a life expectancy prediction by comparing the full discharge profile (e.g., including light intensity levels and the length of time for total discharge) to predict the degradation profile of the batteries and determine when the batteries would no longer provide a requisite emergency light intensity, thus requiring replacement.

The system 100' may continuously receive real-time performance measurements from the sensor devices of the sensor subsystem 108 via the sensor interface 128 and power measurements from the power meter 114 via the power meter interface 132 which is further configured to measure power consumption of the luminaire 112/LED 111 during operation in an emergency state. According to an aspect, the gateway 102 sends these readings in a compressed format to the cloud servers 106. According to an aspect, the gateway 102 is configured to relay the information collected by the system to the at least one server 106 for processing, storage, calculating, compilation, comparing, and the like. According to an aspect, the server 106 includes a processor configured to receive and use the information to calculate and predict the life expectancy of the luminaires 112 and/or LEDs 111 which act as emergency lighting fixtures and to generate and relay a life expectancy report to a user. The compressed format may include two types of messages, namely a baseline message set and an updates message set as discussed with reference to FIG. 4. A message set may be any one of the baseline message and/or set of messages and the updates message set. According to an aspect, the baseline message set includes the full sensor readings, power level readings and current dimming state (for those systems including dimming control) of a luminaire 112. According to another aspect, the updates message set includes changes or differentiations from the previous message set. The baseline message may be sent upon major change, such as a change in the dimming level, while the updates message set may be sent at regular intervals. According to an aspect, the updates message set includes readings that are significantly different from the previous set. In one embodiment, sensor readings can be averaged over the time interval between two consequent updates message sets.

With continuing reference to FIGS. 1 and 1A, the exemplary systems (100, 100') may include a backhaul interface 118 for connecting the gateway 102 and a network gateway 104. The backhaul interface 118 may be a wired or wireless Local Area Network (LAN), including one or more of Mesh Bluetooth Low Energy (Mesh BLE), Smart Mesh, Bluetooth Mesh, Wireless LAN (WLAN), ZigBee, and/or Ethernet LAN. In the exemplary embodiments shown in FIGS. 1 and 1A, the backhaul interface 118 is a Mesh BLE. The communication protocol may include the Mesh BLE. The gateway 102 is thus connected to the back-end network gateway 104 via LAN, WLAN, Wide Area Network (WAN), Mesh BLE radio network or other means. This connection may allow another device on the network local to the gateway or via WAN in the cloud to handle the lumen degradation prediction process and/or other processing of data from the sensor subsystem 108 and other exemplary components of the disclosed systems (100, 100'). Thus, the entire luminaire half-life prediction process can be distributed between physical machines or on a single machine, local or remote to the gateway 102.

Exemplary embodiments in accordance with the present disclosure include the gateway 102 which can interface with other control systems or devices via wired connections, Ethernet connections, wireless connections, or any combination thereof, and can receive control messages that, for example and without limitation, direct the gateway 102 to change the dimming level via dimming control 110 in systems with dimming control 110. This interface includes the at least one backhaul interface 118 to the cloud servers 106 via a backhaul protocol. In further aspects of the exemplary disclosed embodiments, the backhaul protocol is capable of delivering dimming directions for the luminaires 112 to the gateway 102 and receiving sensor and power level readings of the luminaires 112 from the sensor subsystem 108 and power meter 114 via the gateway 102.

According to an aspect, the gateway 102 is connected to the network gateway 104, which resides between the local networks to a WAN 116. In the exemplary embodiments shown in FIGS. 1 and 1A, the WAN 116 connects the gateway 102 to cloud computers/servers 106 for operational and management interfaces. According to an aspect, the gateway 102 is configured to receive control instructions, e.g., a plurality of dimming levels for the luminaires 112 and is capable of communicating sensor readings and dimming levels of the luminaires 112, as well as a power reading of the luminaire 112, over the wired/wireless network(s) 118 and via the WAN 116 to the server 106 for processing.

In exemplary disclosed embodiments the cloud servers 106 are continuously receiving performance measurements from one or more gateways 102 and/or sensor subsystems 108. In one embodiment the cloud servers 106 provide each gateway 102 with a table of reading directions that includes the correct sensor reading thresholds for specific dimming levels associated with the specific luminaire 112. The gateway 102 may report changes or deviations from this internal table to the cloud servers 106, when deviating measurements are received from sensor subsystem 108. Accordingly, the amount of information that needs to be transmitted over the backhaul interface 118 is reduced to information that constitutes a deviation from threshold levels for, e.g., light intensity. In this way the cloud server applications can control the rate of information sent by the gateway 102 and more accurately predict the luminaire 112, LED 111, and/or emergency power source behavior.

The exemplary systems (100, 100') may send sensor readings and other information over the backhaul 118 to the cloud server 106 at random times, in certain embodiments. According to an aspect, this allows for better utilization of the backhaul 118, which may be a wireless mesh network with limited backhaul capacity. In an embodiment, a message being sent at random time periods during the day will include a correct time stamp of the reading, and the dimming level. The message receiving time at the cloud server is not the measurements' time, thus tagging the measurement correctly with time of measurement may be required.

FIG. 2 depicts an illustrative embodiment of the gateway 102. According to an aspect, a soft switch 202 to select between different electrical dimming interfaces is provided. The soft switch 202 may be actively used to search for the correct protocol between the gateway 102 and the luminaire 112 (not shown in this figure). The luminaire 112 may be a dimming luminaire 112. According to an aspect, protocol modules 228, 230, and 232 are the software implementation of the dimming interfaces that reside in the gateway 102. In an embodiment, the supported dimming protocol includes several sets of protocols, such as, for example, 0V-10V, 1V-10V, Pulse Width Modulation (PWM) 228 protocols over 0V-10V and/or 1V to 10V, a 24V DALI® 230 protocol, and a 5V DMX 232 protocol. The protocols may include algorithms that are implemented in a Micro Controller Unit 2 (MCU-2) 204. According to an aspect, the MCU-2 204 is powered by the AC to DC 5V, 24V 220 via a power line connection 240. MCU-2 204 may also be connected to a power meter 114 via a Micro Controller Unit 1 (MCU 1) and a Universal Asynchronous Receiver/Transmitter 224 (UART 224). MCU-2 204 may also be connected to Relay 206 and Relay 250. The MCU-2 204 may also be connected to a Wireless Interface Module (WIM) 210 via a Serial Peripheral Interface (SPI) bus 212. In an embodiment, the MCU-2 204 also controls the Relay 206 and Relay 250, which may be designed to be able to cut off/block the current to the luminaire 112 upon a decision by the MCU-2 204. The power cutoff can be used to disconnect power from the controlled luminaire subsystem (see, for example, FIG. 1). In an embodiment, the WIM 210 is implemented as a Bluetooth Low Power (BLE) device using Mesh BLE protocol to connect with other devices, as well as having the SPI bus 212 and an Inter-Integrated Circuit two-wire serial interface bus (TWSI) 216. The WIM 210 is connected to the Camera Interface System (CIS) Module 214, which may be, for instance, the environmental sensor and a Red, Green, Blue (RGB) sensor combination device. The CIS module 214 can be extended via a TWSI bus 226 with other sensor modules. The CIS module 214 may require a clock, which is received via the AC Frequency to a clock module interface 218. The WIM 210 may require power, which is typically received via the AC to DC 5V to 24V 220 via power interface line 240. According to an aspect, an AC Power 90V-240V 222 is relayed to the MCU2 204 via a Line Control (LNNL) 234, and relayed from the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2 and according to an aspect, provides the physical electrical line connections.

Figure 3:
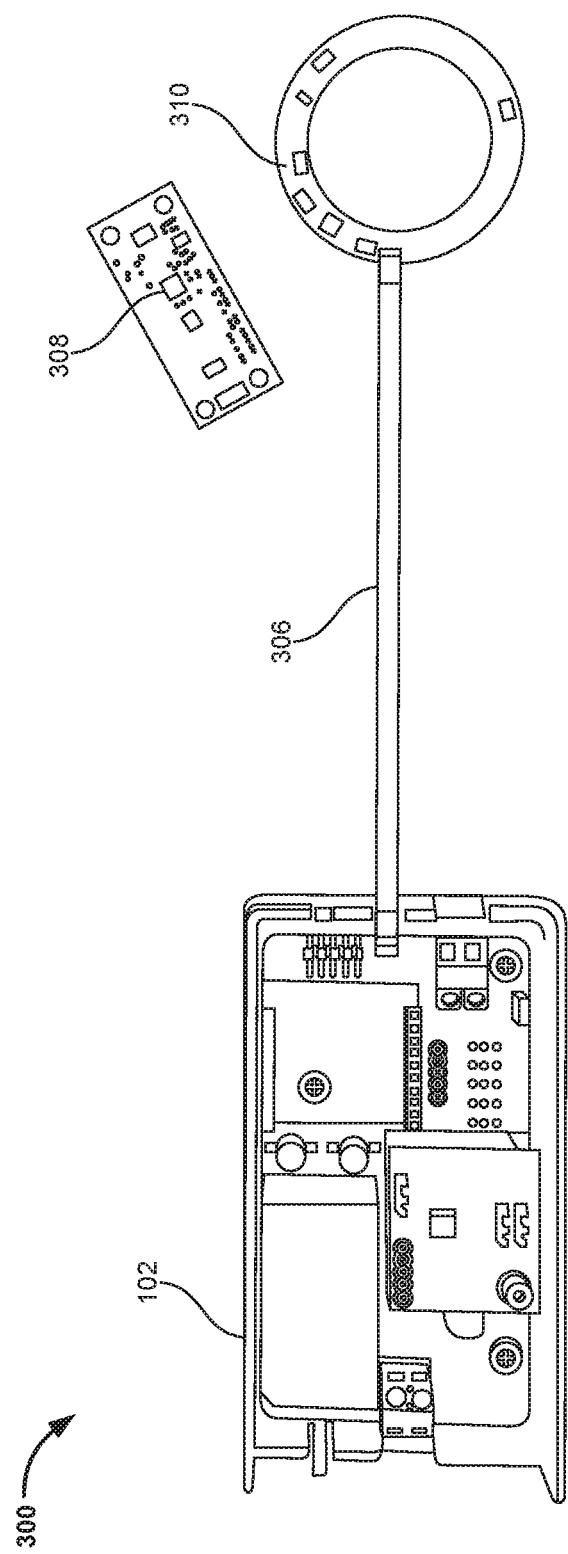
FIG. 3 illustrates a diagram of a sensor connection to a luminaire, according to an aspect.

According to an aspect and as illustrated in FIG. 3, the system 300 may include one or more sensors, typically configured as CIS modules, connected to the gateway 102. FIG. 3 illustrates an embodiment that includes at least one of a first CIS module 308 and a second CIS module 310. While only one connection is depicted in FIG. 3, it would be understood by one of ordinary skill in the art, that one or both CIS modules 308, 310 may include a physical interface with the gateway 102 via a TWSI connection that uses a 6 or 8 pin Flexible Printed Circuit (FPC) cable and connector 306. The CIS modules 308, 310 may be physically connected somewhere on the luminaire 112. According to an aspect, the CIS module 308 is a linear module that can be adopted to fit on devices that require a linear fitting. In an embodiment, the CIS module 310 is circular, and may be designed to fit circular-shaped luminaires 112. According to an aspect, the environment and color sensors of the sensor subsystem 108 are placed/connected on a fitting of the luminaire 112 and/or LED 111. The exact location of the sensors is not necessarily fixed, e.g., two different luminaires by the same manufacturer of the same type of fitting and LED specifications may be assembled such that the sensor location is different relative to the surface and dimensions of the fitting. Thus, the location of the color and environment sensors on the fitting is not limited. The requirement of placing the color and environment sensors on the fitting at specific locations is mitigated by this disclosure.

In an embodiment, each of the CIS 308 and 310 comes with at least two sets of one or more sensors (not shown). A first sensor or set of sensors ("environment sensor(s)") may be dedicated to sensing conditions of an environment in which the luminaire is installed and may be arranged such that it faces away from and/or extends in a downwardly fashion from the luminaire 112. According to an aspect, a second set of sensors or a single sensor ("color sensor" or "up looking sensor") is arranged such that it faces the luminaire 112 directly. In the disclosed exemplary embodiments, the color sensor is an RGB sensor. The combination of the two sets of sensors, namely the environment sensor and the RGB sensor, may be combined into a single ASIC or may be arranged as a set of separate devices. According to an aspect, the first and second sensors of the CIS 308 and CIS 310 modules may also connect with the gateway 102. Both sets of sensors may provide real time measurements and assessments to the server 106 via the gateway 102. In response to the measurements and assessments provided, the sever 106 may control via the gateway 102 the dimming control 110 and change parameters such as the dimming level, color intensity, color temperature, and RGB/RGBW (Red Green Blue Warm White) color, in devices that allow for such control.

Figure 14:
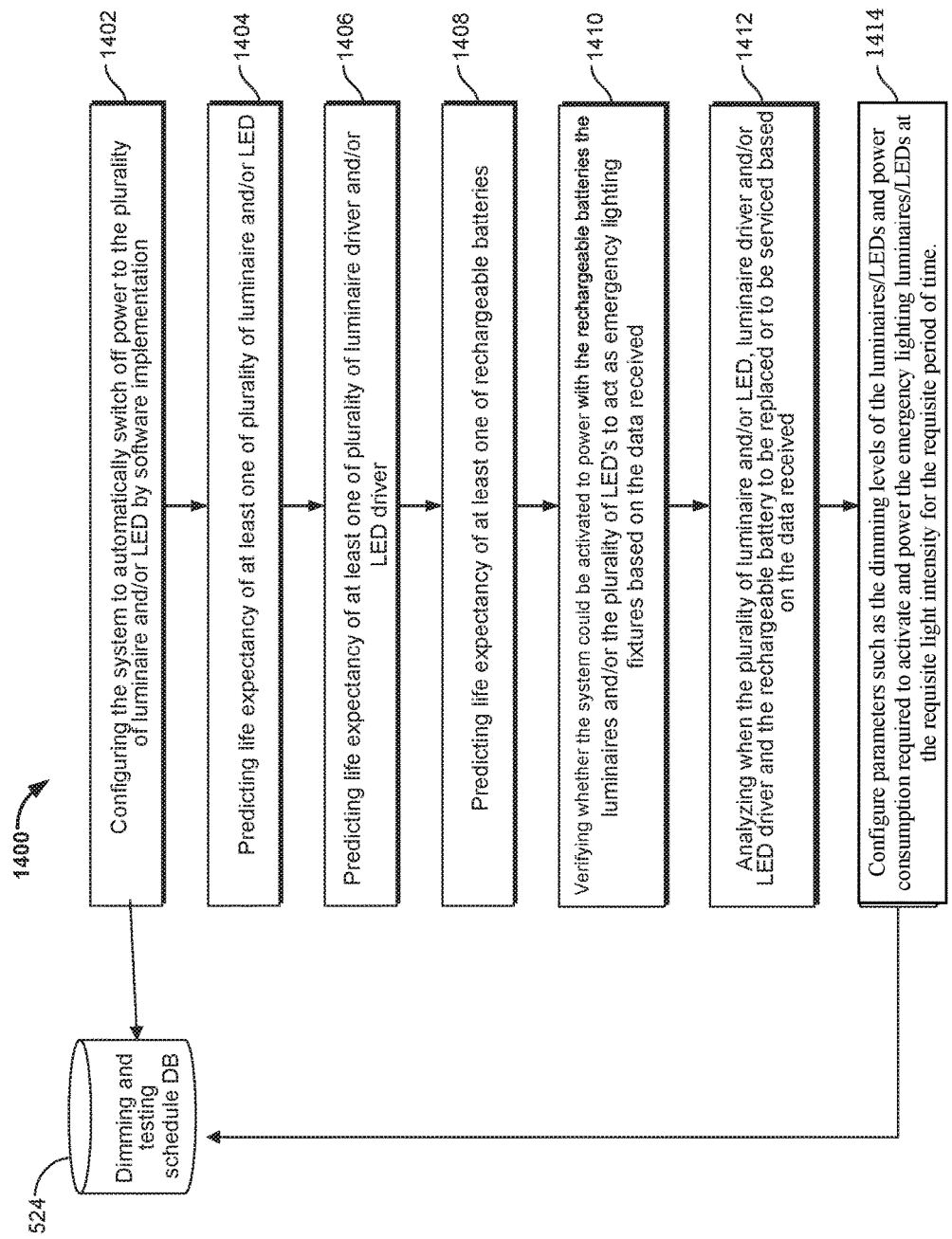
FIG. 14 is a method of predicting emergency lighting fixtures life expectancy according to an aspect.

In general, aspects of the present disclosure provide a method of predicting a life expectancy of an emergency lighting fixture. FIG. 14 illustrates an exemplary embodiment and a configuration 1400 of a high level operation of the disclosed systems. According to an aspect, at step 1402, the system is configured to automatically switch off power to the plurality of luminaires and/or LEDs by software implementation. At step 1404, life expectancy of at least one of the plurality of luminaires and/or LEDs is predicted. At step 1406, life expectancy of at least one of the luminaire driver and/or the LED driver is predicted. In the exemplary disclosed methods of calculating/predicting life expectancy, the system identifies and controls dimming levels of one or more luminaires that act as emergency lighting fixtures. The method may include the system receiving a plurality of sensor readings associated with the dimming levels of the luminaires, for example, a light intensity at various dimming levels and conditions of the environment in which the luminaire is installed. As previously discussed with respect to the exemplary disclosed embodiments of a system, the plurality of sensors are connected to at least one gateway 102 which is capable of controlling the dimming levels of the plurality of luminaires 112. The method further consists of forwarding to the servers 106, by the gateway 102, the sensor readings along with power readings of the plurality of luminaires 112 for further processing.

Figure 6:
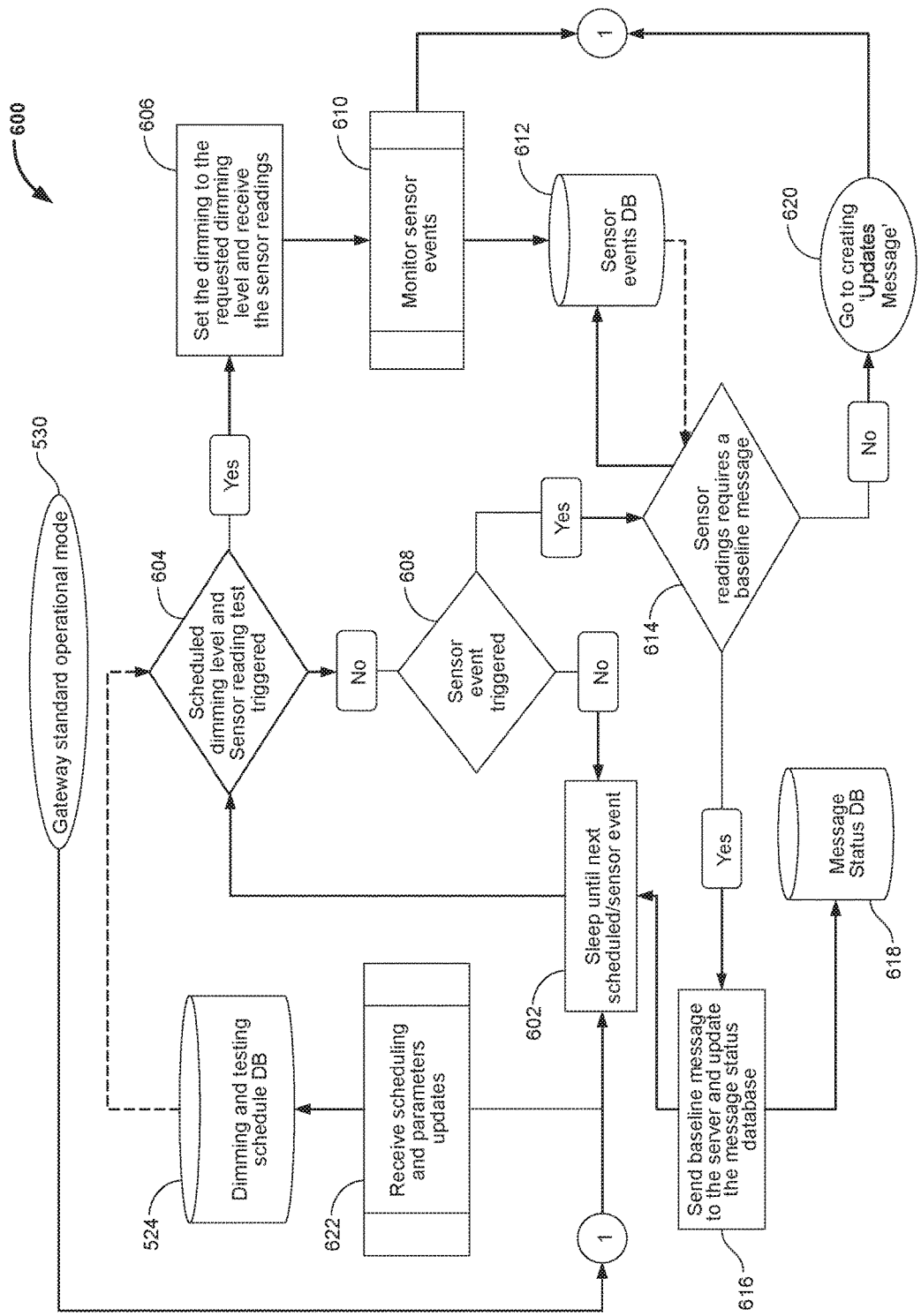
FIG. 6 illustrates a flow chart of a system handling a gateway Standard Operational Mode, according to an aspect.

The exemplary method also includes the recording in memory of information received from the sensor subsystem 108 as discussed in further detail with respect to FIG. 6.

With continuing reference to FIG. 14, at step 1408, life expectancy of an emergency power source (e.g. a rechargeable battery), according to the exemplary embodiments, is predicted according to the exemplary disclosed testing procedures. At step 1410, data regarding the life expectancy of the emergency power source is used to verify whether the emergency lighting luminaires and/or LEDs could be powered at the requisite light intensity for the requisite amount of time to act as emergency lighting fixtures.

At step 1412, the system, including the server 106, is configured to further analyze when the plurality of luminaires and/or LEDs, luminaire driver and/or LED driver, and the rechargeable batteries should be replaced or serviced to avoid a failure of the emergency lighting system. For example, the predictive degradation and life expectancy calculations for those components during operation on the emergency power source may be used to predict a point at which the components may fail to provide an emergency lighting system with the requisite light intensity for the requisite amount of time. Based at least on the information acquired from steps 1404-1412 during operation of the emergency power source, at step 1414 the system configures parameters such as the dimming levels of the luminaires/LEDs and power consumption required to activate and power the emergency lighting luminaires/LEDs at the requisite light intensity for the requisite period of time. All of the data obtained in steps 1402-1414 is then fed to a dimming and testing schedule database (DB) 524, which is further shown in FIG. 9 and described with respect to the exemplary disclosed methods implemented in the luminaire, driver and battery DB 416.

In various aspects, the exemplary disclosed methods include interfacing by the gateway 102 with a plurality of other control systems and/or devices via at least a wired connection, an Ethernet connection, a wireless connection or a combination thereof. According to an aspect, the gateway 102 receives instructions to control the dimming level of one or more luminaires 112 via dimming control 110. The interface present in the gateway 102 may be a backhaul interface 118 running a backhaul protocol. In an embodiment, the backhaul protocol is responsible for delivering instructions to the gateway 102 to control the dimming level of the plurality of luminaires 112. The exemplary methods may further include receiving at the gateway 102 information from the sensor subsystem 108 regarding, e.g., color contents, light and/or color intensities, and the light sources' environments which are directly associated with the dimming levels and dimming level instructions. The exemplary methods also include communicating and handling a plurality of dimming protocols by the gateway 102 via its dimming interface. In various exemplary embodiment, the plurality of dimming protocols may be at least a 0V-10V, 1V-10V, DALI®, DMX, digital protocols and analog protocols, and so on as known. The gateway 102 may further include various methods and/or tools to record received instructions, such as local memory and/or databases.

The exemplary methods may further include controlling a dimming control 110 located inside the plurality of luminaires 112 by the gateway 102. According to an aspect, controlling the dimming control 110 by the gateway 102 is utilized to change, for example, the dimming level and/or the color temperature and/or the RGB/RGBW colors of the plurality of luminaires based on a database of instructions associated with a time schedule, such as dimming and testing schedule 524. In an embodiment, the gateway 102 receives a set of instructions associated with dimming setups and a plurality of sensor measurements from a plurality of sensors according to a specific moment of any day. Upon receiving these instructions the gateway may record these instructions and/or transmit them to the server, and a scheduler checks the information on a timely basis and acts on these instructions.

According to a further aspect, an exemplary method to program the sensor subsystem 108 associated with the gateway 102 provides data only when the color/light intensities are outside of a predetermined range. In an embodiment, a method to enable scheduling control in ways/manners that allow measurements to be taken only when environment measurements, as well as the dimming levels, reach certain ranges and within time schedule limitations of the gateway is provided. In an embodiment, the dimming parameters, the sensor parameters, and the reading setups are delivered all or in parts from outside of the gateway 102 via at least a cloud server 106 connected to the gateway. The gateway 102 may be configured to communicate these parameters, store them on the device in a database and manage their life cycle, as described further below with respect to FIG. 5.

The exemplary method(s) may also include measuring real time power by at least one power meter 114 connected to at least one luminaire 112, wherein the real-time power measurements correlate 1-1 to the power drawn by the luminaire 112 at any given moment during operation of either the main power source or the emergency power source. The interface between the gateway 102 and the power meter may be a Universal Asynchronous Receiver/Transmitter (UART) or other communication interfaces ("power meter interface").

According to a further aspect of the exemplary disclosed methods, the cloud servers 106 include continuously receive a performance measurement information from the sensor subsystem 108, power meter 114, and gateway 102, via gateway 102, during operation of the luminaire(s) 112/LED(s) 111 with the main power source or emergency power source. The one or more cloud servers 106 may include methods to correlate the performance measurements and the specific luminaire characteristics controlled by the gateways 102. In certain embodiments, the method includes derivations of at least one lumen prediction graph by the plurality of cloud servers 106. The prediction may be based on the lumen prediction graph, that is, the theoretical lumen degradation prediction graph in ideal known conditions estimated by the luminaire manufacturer and the gateway measurements. In the same or other embodiments in accordance with the present disclosure this correlation information can accurately predict $L_{70}$ (degradation to 70% of luminaire lifetime) and $L_{50}$ (degradation to 50% of luminaire lifetime) for the specific luminaire in its current environment.

The exemplary disclosed methods may also include predicting an accurate lumen degradation graph using the cloud server 106. The predictive lumen degradation graphs may be based on, among other things, correlations between dimming state changes and the real time sensor readings of the environment and color sensors, as well as electrical current (Ampere) levels used by the luminaires during emergency operation. In an exemplary disclosed embodiment, the cloud server 106 uses the correlated information and predictions to recommend alternative dimming schedules that will extend the half-life ($L_{50}$) of the luminaires in the system, while maintaining expected luminosity at the appropriate levels and for requisite periods of time during emergency operation.

Embodiments in accordance with the present disclosure are also capable of predicting a lumen degradation or depreciation graph for a specific luminaire 112 regardless of the brand, type, or individual luminaire, either during operation using the main power supply or the emergency power source. The lumen depreciation graph is instead based on correlations between actual dimming state changes, real time sensor readings of the environment and up looking sensors, and the power consumption used by the luminaire 112. Further, the exemplary embodiments use lumen depreciation and degradation profiles to recommend alternative dimming schedules to extend the half-life ($L_{50}$) of the luminaires 112 while maintaining expected luminosity at the appropriate level. In another aspect, the exemplary embodiments provide reverse predictions in which based on a given luminosity dimming schedule for the specific luminaires 112, and based on real time sensor readings, the system 100 can accurately predict the half-life of the luminaire 112.

Figure 4:
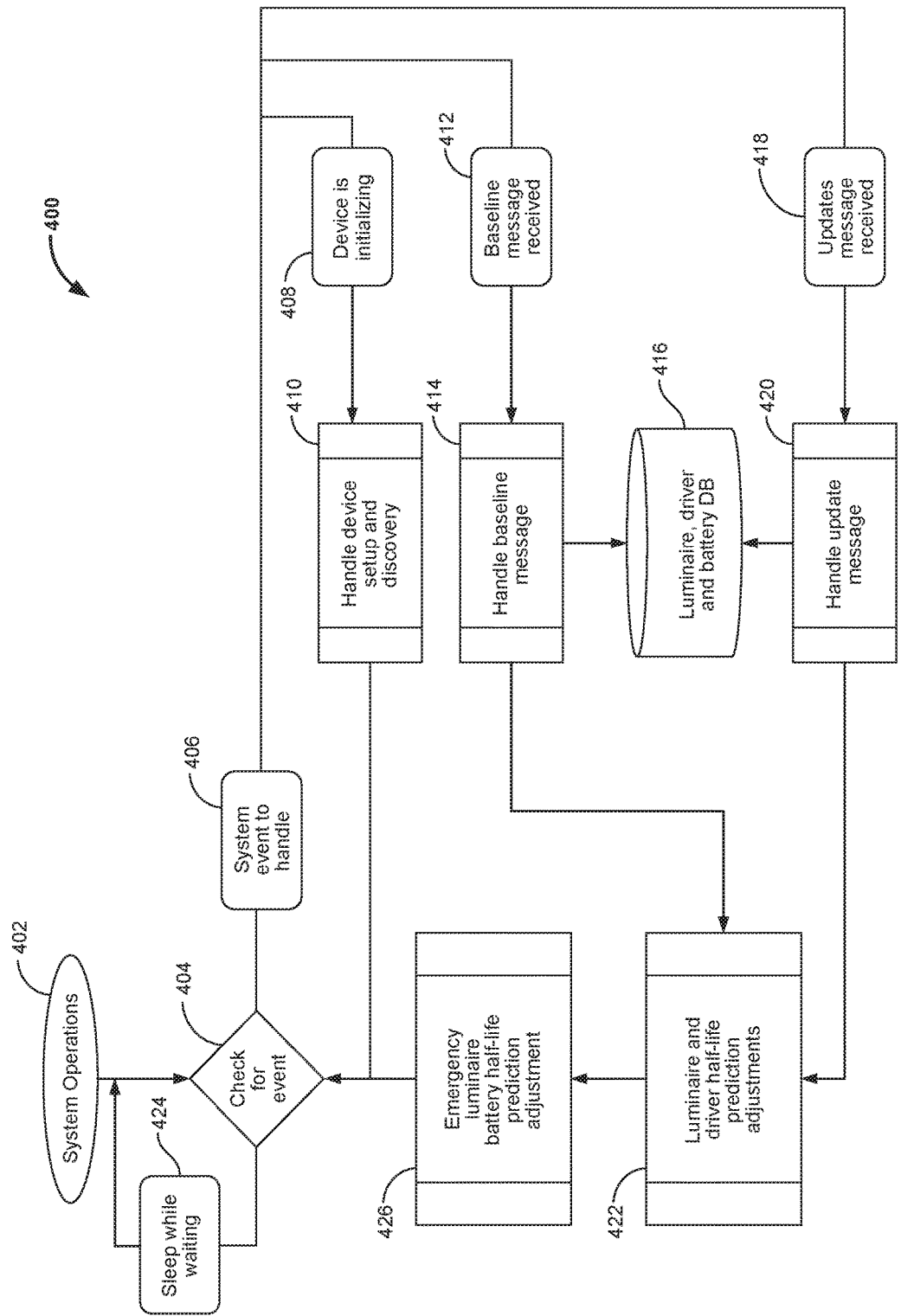
FIG. 4 illustrates a flow chart of a system handling a procedural global event, according to an aspect.

FIG. 4 illustrates a flow chart of an exemplary method 400 for high level operations of the exemplary system embodiments. According to an aspect, the exemplary systems are configured to perform various high-level system operations 402 via the server 106 (see FIG. 1), and in particular is configured to predict lumen depreciation and/or life expectancy, and to make correlations between the two. According to an aspect, at step 402, initiation of the system operations 402 may begin. The at least one gateway may initialize operation of the system based on at least one communication message exchanged with the server. At step 404, the system checks whether there are events that need to be handled. If the result of step 404 is that there are no events that need to be handled by the system, the operation goes to step 424, during which the system may go back to sleep. If the result of step 404 is that there are events that need to be handled by the system, the operation goes to step 406. At step 406, the system checks different events that need to be handled. According to an aspect, at least three different types of events 408, 412, and 418 may be present. As illustrated in FIG. 4, the events may include a first event at step 408 ("Device is initializing"), a second event at step 412 ("Baseline message received"), and a third event at step 418 ("Updates message received").

At step 408, the system may identify the first event, which may be to initialize and/or handle a current device/luminaire, then move to step 410. At step 410, a new device/a new luminaire may be discovered and properly set-up. If the device is already initialized, the system may look for a baseline message at step 412 and/or an update message at step 418. Thus, at step 412, the system recognizes the second event, which may include receiving baseline messages. The baseline messages include but are not limited to initial settings and/or readings from the dimming control device, sensor subsystem and/or power meter related to the specific luminaire(s). At step 414, the system may handle the baseline message(s) and simultaneously forward the baseline message(s) to a luminaire, driver, and battery (DB) 416 and/or step 422 for luminaire half-life prediction adjustments based on the baseline messages. According to an aspect, the baseline message(s) are collected/recorded in the luminaire, driver, and battery (DB) 416, which is a repository to receive and store information from the sensor subsystem and/or power meter and/or aspects of the individual luminaire/LED. At step 422, the baseline message(s) may be used, in conjunction with all other data collected in other steps during operation with the main power supply, to establish and/or update/adjust the half-life and/or end-of-life prediction and requirements for the specific luminaires. At step 426, the baseline message(s) may be used, in conjunction with all other data collected in other steps, to establish and/or update/adjust the half-life and/or end-of-life prediction and requirements for the specific emergency power source such as rechargeable batteries.

The luminaire, driver, and battery DB 416 is configured to receive and store the information collected from the system and/or luminaires. Alternatively and/or simultaneously, at step 418, the system recognizes the third event, which may include receiving the updates message(s). The updates message(s) include but are not limited to settings and/or readings from the dimming control device, sensor subsystem and/or power meter related to the specific luminaire(s) that are received at a point in time other than the initial settings and/or readings received with the baseline messages and are essentially updates to previously recorded settings and/or readings. At step 420, the system may handle/process the updates message 418 and then forward the updates message simultaneously towards the luminaire, driver, and battery DB 416 and/or step 422 for luminaire and driver half-life prediction adjustments. According to an aspect, the updates message is received and recorded in the luminaire, driver, and battery DB 416. At step 422, the updates message(s) may be used, in conjunction with all other data collected in other steps during operation with the main power supply, to establish and/or update/adjust the half-life and/or end of life prediction and requirements for the specific luminaires. At step 426, the baseline message(s) may be used, in conjunction with all other data collected in other steps, to establish and/or update/adjust the half-life and/or end-of-life prediction and requirements for the specific rechargeable batteries.

After handling incoming messages of any type, such as, for example, the baseline messages or the updates messages (see, for instance, FIG. 7), the measurement updates or changes may be transferred to and recorded in the luminaire, driver, and battery DB 416. According to an aspect, the luminaire, driver, and battery DB 416 may also record the handling of the device setup and/or the device discovery. According to an aspect and as found in step 422 and 426, after the handling of the baseline message and the updates message at steps 412 and 418, the system may predict the luminaire half-life or adjust its predictions of the luminaire half-life and batteries based on the updates, and as will be discussed in greater detail herein below with reference to FIG. 8. Changes in the dimming schedule of any luminaire will typically impact the luminaire's half-life expectancy, therefore, over time and based on usage, the predictions will change and become more accurate to the specific point in-time of the measurements.

According to an aspect, the server utilized in the system operations 402 is at least one of a cloud server and a local server. In an exemplary embodiment, the system performs the system operations 402 via only the cloud server (see, for instance, FIG. 5). The cloud server may primarily be in a sleep mode while waiting to check for the presence and/or status of events, or a reactive mode, during which it waits for the occurrence of events. The cloud server may actively/regularly wake up from its sleep mode to check/assess whether any of the events exist 404. According to an aspect, the server manages each of the first, second and third events at different stages/through different processes. According to an aspect, the first event 408 is managed/handled during a set up and discovery process, illustrated in FIG. 4 as 'Handle device setup and discovery' 410. (See also FIG. 5.) The second event 412 may occur when a baseline message has been received, and is illustrated in FIG. 4 as 'Baseline message received'. The handling of baseline messages/'Baseline Message' types of messages is described in further detail herein below, with particular reference to, for example, FIG. 6. The third event 418 may be associated with the receipt of message updates, and is illustrated in FIG. 4 as 'Updates message received' 418. Creation of updates messages/'Updates Message' types of messages is described in further detail herein below, with particular reference to, for example, FIG. 7.

Figure 5:
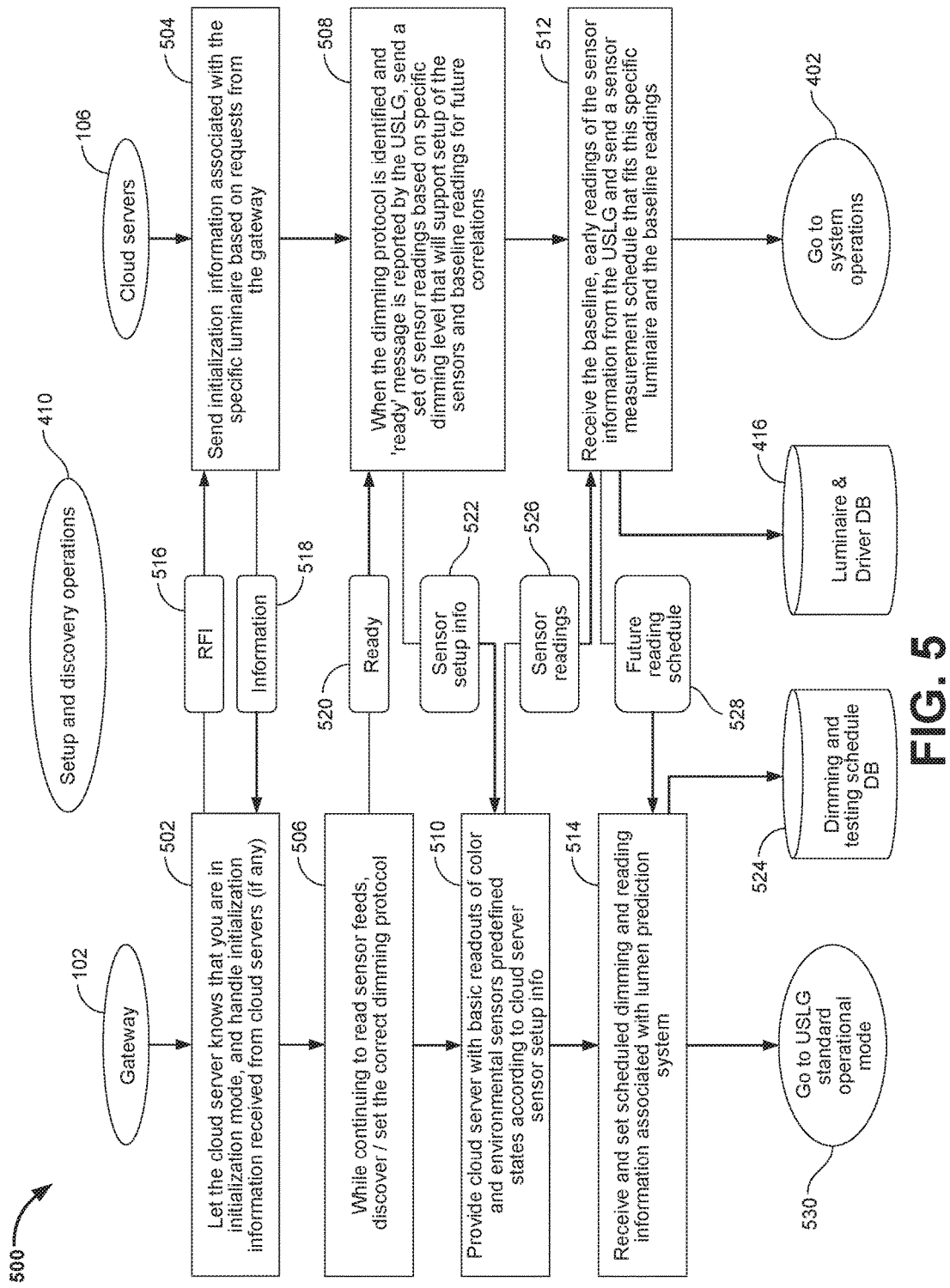
FIG. 5 illustrates a flow chart of a system handling a device setup, according to an aspect.

FIG. 5 depicts an exemplary embodiment 500 of handling of device setup and discovery operations starting at step 410. According to an aspect, the step 410 includes the discovery and proper set-up of the device/the luminaire. The setup and discovery operations may include a flow of information that occurs as two separate parts of the system 500, each including a request for information (RFI) 516 flow to server 106 and a flow from the server 106 of Information 518, which may include initialization information from a particular controlled luminaire. According to an aspect, the first event after turning on a gateway 102 may include the RFI 516 being sent/transmitted from the gateway 102 to the server 106. As illustrated in FIG. 5, at step 502, the gateway 102 may send the RFI 516 towards the server 106. Thus, the gateway 102 may ask the server 106 to provide the minimal initialization information 518. According to an aspect, if the server 106 is already familiar with the particular luminaire, the first event may include providing more information 518 based on this knowledge/familiarity/association with the particular luminaire. At step 504, the cloud server 106 may return the initialization information 518 to the gateway 102, then proceed to step 506. At step 506, the gateway 102 may continue to read sensor feeds, and identify/discover/set the correct dimming protocol/level. According to an aspect, once the gateway 102 has set the appropriate dimming protocol for the luminaire, a "ready" message 520 is sent to the server 106. The ready message 520 may include identifying the luminaire, the luminaire's dimming protocol and sensor information, as collected during the dimming protocol test/discovery 506 by the gateway 102. In an embodiment, the server 106 responds with dimming and sensor information 522 associated with the setup of the sensors for baseline and for tune-up. At step 510, the gateway 102 may set the luminaire to a predefined state and collect the reading of the sensors, such as, for example, the color sensors and the environmental sensors. According to an aspect, the information collected is sent to the server 106 as part of a 'Sensor Readings' message 526. The information collected may include the baseline or early readings of the sensor information. The cloud servers 106 may then send back a future reading schedule 528 that includes final tune-up information, a schedule for dimming, and/or a sensor measurement schedule for measurements that need to be done on a regular basis. While sensor measurements may begin upon installation of the luminaire, sensor measurements would not typically impact the predictions of life expectancy until the device had achieved about 1000 hours of service or operation. In other words, the calibration or calculation of the real-world life expectancy of the particular luminaire 112 would not be impacted until after the luminaire had been working for 1000 hours. According to an aspect, at step 514, the gateway receives and sets scheduled reading and dimming information associated with the half-life prediction system/lumen prediction system. The server 106 may update the Luminaire, Driver and Battery DB 416 and continue to system operations 402 (and FIG. 4). In an embodiment, the gateway 102 records the scheduling information in a dimming and testing schedule DB 524. The gateway 102 may continue to the gateway standard operational mode 530 (and FIG. 6).

FIG. 6 illustrates an embodiment 600 of the gateway standard operation mode 530. According to an aspect, at step 602, the gateway is primarily in a sleep mode during which it waits for one or more events to occur. In an embodiment, each event may include setting a new dimming level and waiting for a single sensor event or multiple sensor events. According to an aspect, the types of the events the gateway may wait to occur include two types. The first type of event may be associated with existing dimming and testing, including, for example, at a specific/designated time, setting a specific dimming level, and waiting for a set of sensor readings. For instance, at step 622, a "receive scheduling and parameters updates" process 622 may update the dimming and test schedule DB 524 and may also refresh a sleeping timer (not shown) for the gateway to wake at the next appropriate test schedule. According to an aspect, the second type of event includes current/present sensor readings that need to be read and processed.

When the gateway is out of sleep mode/initialized, the gateway may receive a scheduling message from the cloud servers as seen at step 622. The scheduling message may include parameters to populate the dimming and test schedule DB 524. At step 604, the gateway may check for any scheduled tests, which may be waiting in the dimming & testing schedule DB 524. For instance, when the scheduled test is triggered at step 604, the gateway may set the dimming level to a requested lumen/light percentage. According to an aspect, the gateway does not process or handle events that are not planned for and/or scheduled by the dimming & testing schedule DB 524. If at step 604 there is no scheduled testing event waiting, e.g., 'No', then the operation moves to step 608, where the gateway checks for any triggered sensor events as described in greater detail below. If at step 604, the scheduled test is triggered, 'Yes', the gateway standard operational mode 530 proceeds/moves to step 606 where the gateway sets the dimming protocol to a requested dimming level and reads the sensor status. In an embodiment, after step 606, the gateway performs step 610 where the gateway starts to monitor sensor and/or driver events—e.g., has the sensor(s) or driver/dimming control device changed?

Scheduled dimming level and sensor measurements are conducted at step 606, and include a plurality of sensor readings that must be completed at step 610. The sensor measurement event requests can be, for example, wait for the temperature readings to reach a specific level/range, wait for the AMP reading to reach a specific range, read color intensity for a plurality of colors multiple times, and the like. Such event data is recorded in the sensor and driver events DB at 612. In an embodiment, when a sensor event occurs, there can be multiple outcomes. For instance, if the sensor reading is the last sensor reading required for this specific scheduled dimming measurement, the gateway may make a decision if the set of measurements requires a new Baseline message at step 614, and if "No", moves to creating an Updates message at step 620. In the case of a baseline message, the gateway may format a new baseline message at step 616 and send it to the server, (not shown), update the schedule to wait for the next dimming schedule and go to sleep at step 602.

The updates message is described in further detail herein below, and in accordance with FIG. 7. In an embodiment, after the updates message is handled, the gateway goes back to sleep (see, for instance, FIG. 4). The third case may occur when there are more events associated with/chained to the current scheduled dimming that the gateway must wait for. In this case, the gateway may go to sleep/enter a sleep mode while waiting for those events. According to an aspect, before the gateway goes to sleep to wait for the other events, the current event is recorded in the Sensor Events DB 612, where all accumulated and scheduled events are recorded for future processing. At step 608, the gateway may check for any triggered sensor events. If the response is 'Yes', than the operation moves to step 614. If the response is 'No', then the operation may go back to the step 602 and wait for an event to occur. According to an aspect, at step 614, the gateway may decide if the sensor reading requires baseline messages. If the response is 'Yes,' then the operation moves to step 616. If the response is 'No', then the operation moves to step 620. In an embodiment, the decision to move to one of the step 616 and the step 620 is based on multiple factors, which may primarily include differences between the previous baseline message and the current changes in the baseline messages. According to an aspect, the operation may also move to one of the step 616 and the step 620 if there is no prior baseline message. In an embodiment, at step 616, the gateway sends baseline messages and then moves to step 618, where the message status database is updated. When there is a need for an updates message, the gateway may go to step 620. When message generation/creation of updates message is complete/done, the gateway may move to the step 602 and wait for the next event to occur. In an embodiment, each event may include setting a new dimming level and waiting for a single sensor event or multiple sensor events. For every event that occurs, the operation may move to step 612 where the gateway updates the sensor events DB. According to an aspect, monitoring sensor events occurs in parallel/in the background by step 610, while the gateway proceeds to step 602 where the gateway waits for an event to occur.

Figure 7:
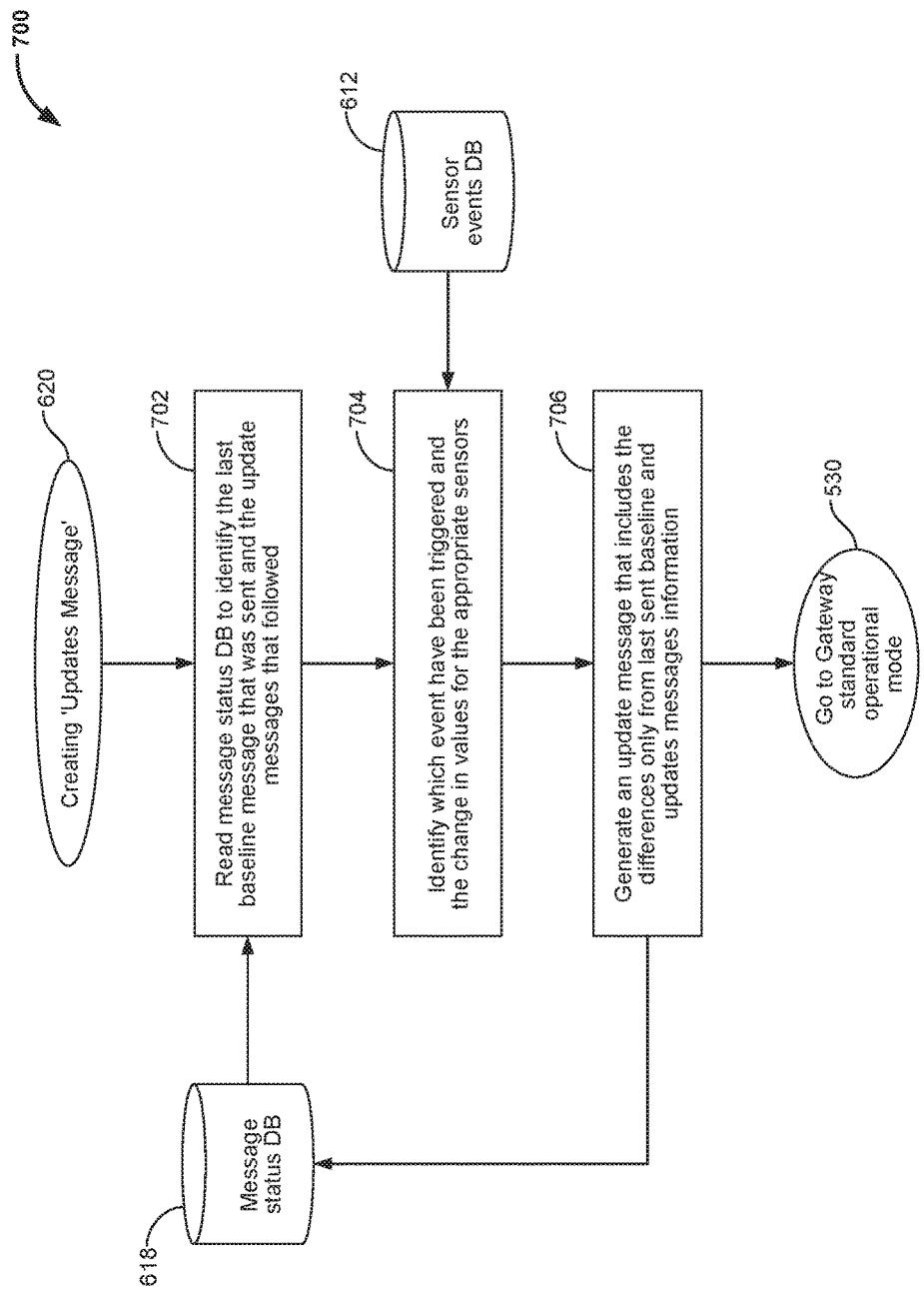
FIG. 7 is a flow chart of a system creating an 'Updates Message', according to an aspect.

FIG. 7 illustrates an embodiment 700 of the creating 'Updates Message' 620 described hereinabove and illustrated in FIG. 6. According to an aspect, the creating the Updates Message may depend on the accumulation of all prior messages sent and recorded in the Message Status DB. Based on past/previous messages and current event information stored in the events DB 612, the gateway may identify sensor readings that have changed and may format a message to include those readings only, and send this message to the cloud server. According to an aspect and with reference again to FIG. 6, once this message is sent, the message status DB 618 may be updated for future analysis, and the gateway may go back to sleep and wait for the occurrence of any next events as part of the standard operational mode 530.

According to an aspect, and as illustrated in FIG. 7, at step 702, after receiving messages from the message status DB 618, the gateway may identify the last baseline message sent and the updates message that followed. At step 704, the gateway may identify which of the events has been triggered and what changes have taken place in the values for the appropriate sensors, after receiving information from the sensor events DB 612. According to an aspect, at step 706, the gateway generates an updates message, which may include only the differences between the previously sent/last sent baseline message and the accumulated updates message information, and the current sensor readings 612. The process of creating updates message 620 may proceed to step 530, in which the gateway moves into the standard operational mode 530. (See, for instance, FIG. 6.) According to an aspect, at step 706, the gateway may simultaneously update the message status DB 618.

Figure 8:
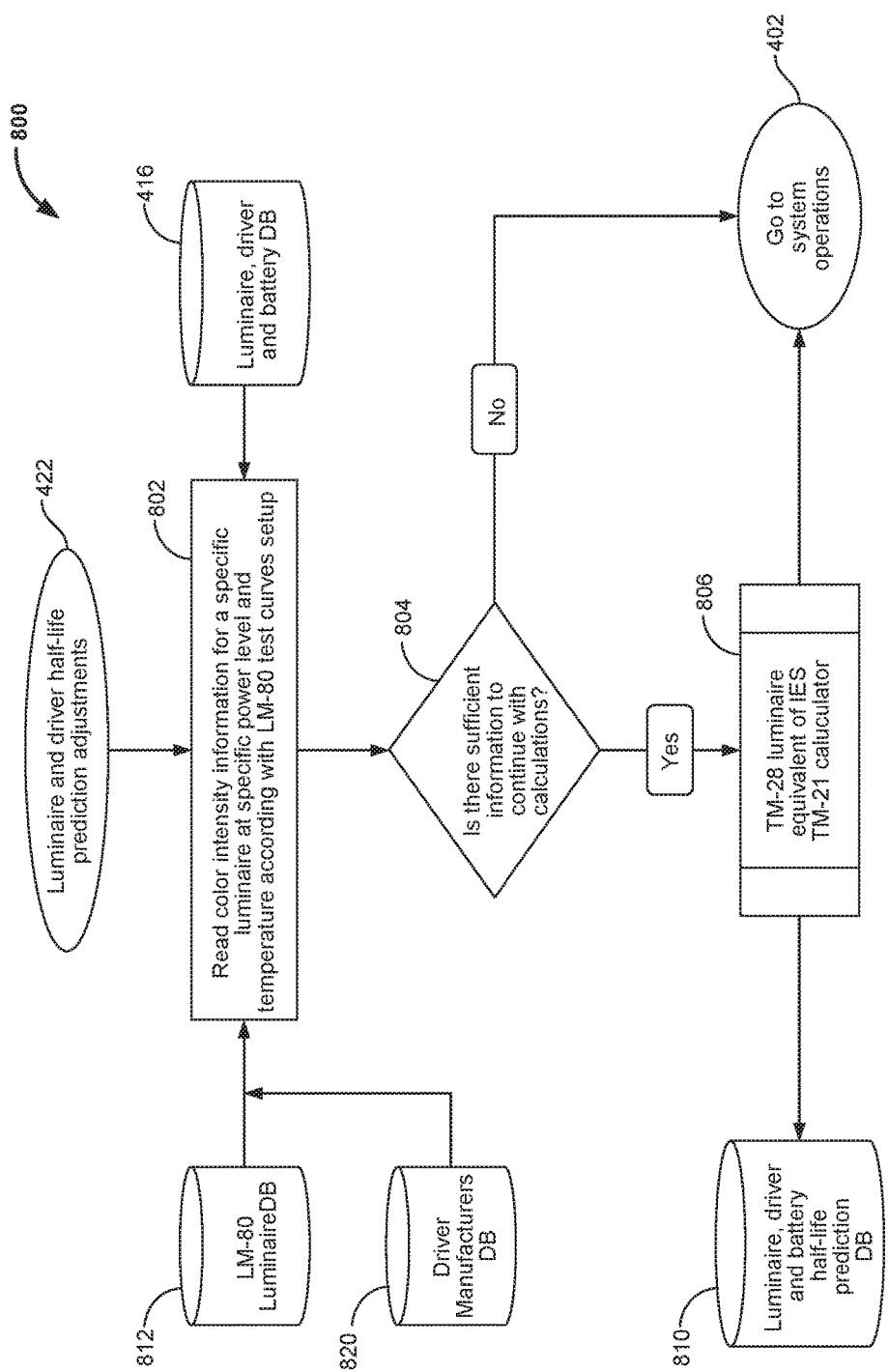
FIG. 8 is a flow chart of a system illustrating cloud servers calculating specific luminaire, driver and battery end-of-life prediction information, according to an aspect.

FIG. 8 illustrates an embodiment 800 of the cloud server 106 calculating specific luminaire end-of-life prediction information. According to an aspect, color sensors are used to demonstrate readings/measurements that are linearly correlated to a luminaire light intensity depreciation graph, which may help to calculate light intensity depreciation/end-of-life prediction. In an embodiment, the color sensors are consistent in their readings across a plurality of sensors, such that when a luminaire/LED light intensity reading changes by X %, the sensor color intensity reading changes in the same X %. In other words, the luminaire light intensity may directly correlate to the sensor color intensity. According to an aspect, the total sensor intensity readings are not equivalent to the actual lumen emission by the luminaire 112 to which the sensors are attached because the light from the luminaire may not impact the sensor directly, depending on, e.g., the position and orientation of the sensor.

When exponential graphs are linearly correlated, a change in one (the curve) can fit the curve (change) in the other directly. Illuminating Engineering Society of North America (IESNA) Standard LM-80 ("Approved Method for Measuring Lumen Maintenance of LED Light Sources") includes manufacturing data for a plurality of LED light sources, which when paired with a luminaire's chip running temperature can provide theoretical predictive life calculations. By testing the luminaire to IESNA LM-79 ("Approved method for the Electrical and Photometric Measurements of Solid-State Lighting Products") standards and utilizing any IESNA Standard LM-82 (""Characterization of LED Light Engines and LED Lamps for Electrical and Photometric Properties as a Function of Temperature") data that may be available, a Luminaire Database 416 may be generated. The Luminaire Database 416 includes information that is specific to the fitting and dimming, as well as to the sensor reading ranges, etc., associated with the specific luminaire. The Luminaire Database 416 also includes information such as past sensor readings, associated times of reading, dimming level, temperatures, current readings, etc. Sensor readings such as color intensity and temperature, among others, can be normalized based on the original (initial) readings received upon installation and/or commissioning of the luminaire in the lighting system as in FIG. 5.

In one exemplary embodiment, an Energy Star® TM-28 calculator, which is the equivalent of an Illuminating Engineering Society (IES) TM-21 ("Lumen degradation lifetime estimation method for LED light sources") calculator 806, is taking data that was collected over time in the Luminaire Database 416 for test samples and is plotting this information after normalization into TM-28. This step allows for prediction of luminaire maintenance over time. The standard information within LM-80 given by the manufacturer is insufficient and is dependent on a fixed temperature and the current state of the luminaire for the readings. In one embodiment, the disclosed system is using the sensor readings at specific temperatures and dimming levels to extrapolate the place of the luminaire color intensity readings on the LM-80 given curves of this specific luminaire. Using this information, and knowing the time period elapsed between readings, and after correlating this information with previous readings, the system can extrapolate a new curve that more accurately represents the current luminaire's behavior. As such, the relationship or correlation between color temperature and dimming level can be determined, and this relationship can be updated over time as the color temperature (lumen level) of the luminaire degrades over time. This new curve is based on the luminaire's true environment and usage (e.g., dimming schedule, power and temperature levels, degradation of the lens and the physical fittings, etc.) over time. This information is stored in the Luminaire Half-life Prediction Database 810 for future use, and the next step is to wait for the next event as part of the System Operations.

In exemplary disclosed embodiments, multiple sensor readings associated with color/light intensity are normalized using an equation where a present sensor reading is divided by an initial sensor reading. The initial sensor reading is the reading that is taken when the luminaire 112 is first initialized during installation or commissioning as discussed with respect to FIG. 5. According to an aspect, the luminaire, driver, and rechargeable battery half-life adjustments/end of life predictions begin at step 802, where the cloud servers 106 read the color intensity information for a specific luminaire at a specific power level and temperature. In an embodiment, step 802 occurs after the cloud servers 106 have received information from the LM-80 Luminaire DB 812, Luminaire DB and luminaire, driver and battery DB 416. The Luminaire, driver and battery DB 416 may include information specific to the fitting and dimming, as well as to the sensor reading expected ranges associated with the specific luminaire 112. According to an aspect, the Luminaire, driver and battery DB 416 may also include all past sensor readings, with the associated times/time stamps of when the reading, dimming levels, temperatures and current readings took place (see, for instance, FIGS. 4-7). In an embodiment, the sensor, temperature, and current readings can be normalized based on the original readings received upon installation of the luminaire 112, as seen, for instance, in FIG. 5.

At step 802, the cloud servers 106 may read the all the information received from Driver Manufacturers DB 820 and the Luminaire, Driver and Battery DB 416 for the specific luminaire 112. The information may include the specific power levels and temperatures, as well as the sequence of temperature changes of the electronic driver 110. According to an aspect, the Luminaire, Driver and Battery DB 416 includes information that is specific to the fitting, the driver, and the dimming level, as well information that is specific to the expected ranges of the sensor readings of the specific luminaire 112. As described in further detail herein above, the Luminaire, Driver and Battery DB 416 may also include all past readings with associated timestamps, and may normalize the readings based on the original readings received upon installation of the luminaire 112. At step 804, the cloud servers 106 may decide if the collected and/or accumulated information/readings are sufficient to continue with calculations. If the response is 'No', then the operation moves to step 402, which is the system operations' main loop where the cloud server will wait for sufficient readings to be collected. If the response is 'Yes', then the operation moves to step 806.

At step 806, the TM-28 luminaire equivalent of the IES TM-21 calculator takes data that was collected over time in the Luminaire Database to create a test sample. The data for the test sample may be plotted in a graphical format, after normalization of the data into TM-28. According to an aspect, this step allows for the prediction of lumen maintenance over time, which helps to predict potential failure of the luminaire 112. At step 426, with reference to FIG. 4 as previously discussed, the information collected about the driver, the temperature and the ON/OFF events (based on current levels, as accumulated and reported) are analyzed/evaluated, and a new end-of-life graph prediction is calculated. At step 810, the information generated in step 806 and step 426 is stored in the Luminaire, driver and battery half-life prediction DB for future use, thus the system may retain the information and use the information to create further half-life and end-of-life predictions based on failure variable indications of the emergency lighting fixtures such as accelerated degradation of luminaires.

Figure 9:
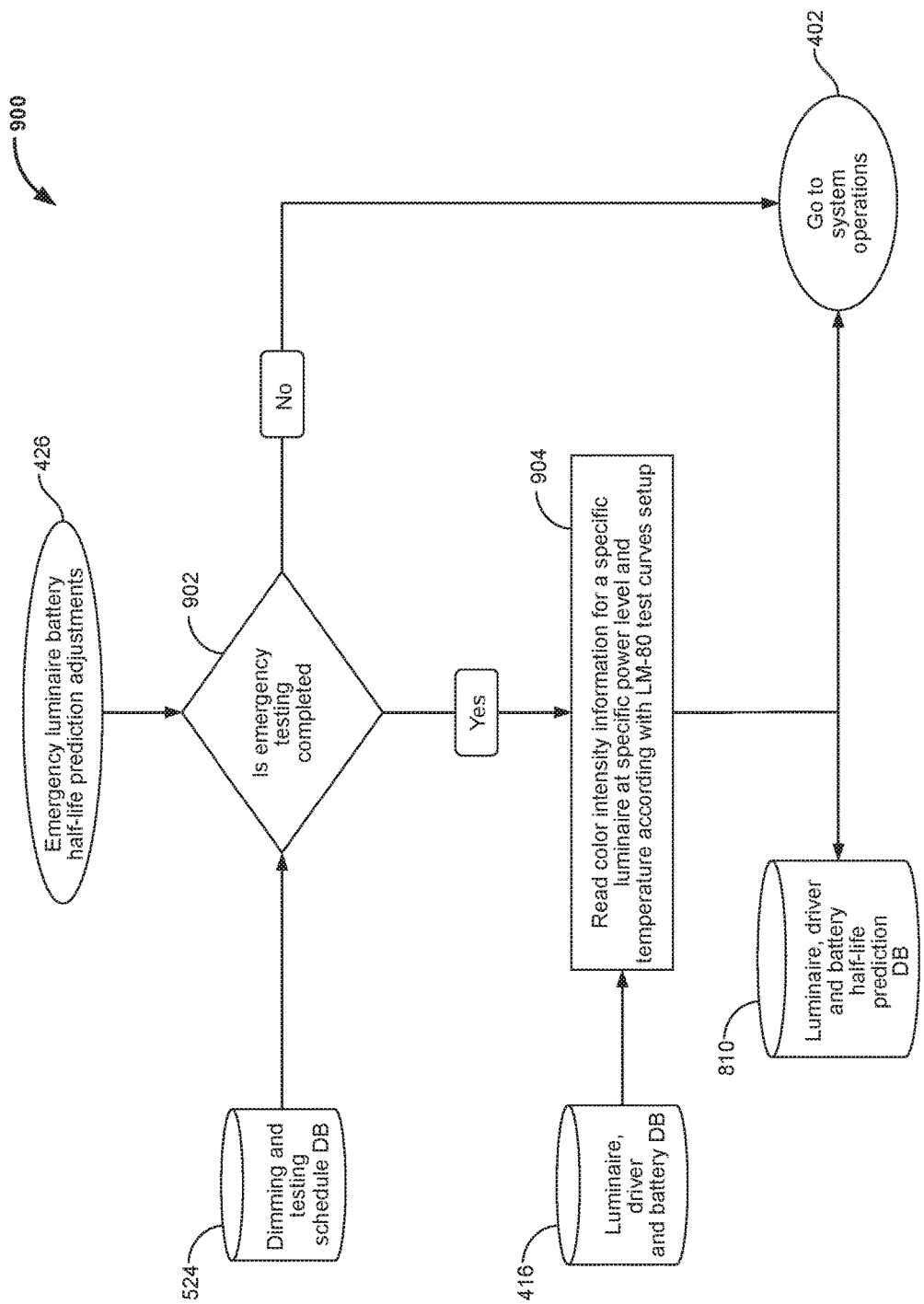
FIG. 9 is a diagram of a system illustrating cloud servers calculating specific battery end-of-life prediction information, according to an aspect.

FIG. 9 illustrates an embodiment 900 of the cloud server 106 calculating specific battery end-of-life prediction information. According to an aspect, the battery half-life adjustments/end of life predictions begins where the cloud servers 106 read the dimming and testing schedule 524 information for a specific battery of a luminaire at a specific power level and temperature. In an embodiment, after the cloud servers 106 have received information from the dimming and testing schedule 524 to conduct the test, at step 902, the cloud servers 106 may decide if the collected and/or accumulated information/readings are sufficient to continue with calculations. If the response is 'No', then the operation moves to step 402, which is the system operations' main loop where the cloud server 106 will wait for sufficient readings to be collected. If the response is 'Yes', then the operation moves to step 904. At step 904, the data regarding, for example, light intensity, color temperature, and/or dimming level during operation of the emergency power source is received from the Luminaire 112, Driver and Battery DB 416 and compared with past test measurement results to generate a predictive graph on how fast the battery drains. The system communicates with at least one dimming protocol module to enact the test procedures to predict the battery failure. The system with or without the dimming control protocol is configured to predict when the battery charge will fail and also verify there is light via the up looking sensor. The Luminaire, Driver and Battery Database 416 may include information specific to the fitting and dimming, as well as to the sensor reading expected ranges, associated with the specific luminaire 112. According to an aspect, the Luminaire, Driver and Battery Database 416 may also include all past sensor readings, with the associated times/time stamps of when the reading, dimming levels, temperatures and current readings took place (see, for instance, FIGS. 4-7). In an embodiment, the sensor, temperature, and current readings can be normalized based on the original readings received upon installation of the luminaire 112, as seen, for instance, in FIG. 5. The Luminaire, Driver and Battery Database 416 may include information such as charging and discharging time of the rechargeable batteries and also to ensure the maximum time period the rechargeable batteries could last. The information generated in step 904 is stored in the Luminaire, driver and battery End-of-Life Prediction Database 810 for future use. The information includes luminaire, battery, and LED end-of-life predictions. Thus the system may retain the information and use the information to create and refine end-of-life predictions based on failure variable indications of the emergency lighting fixtures, such as the luminaire the battery, and the LED. In some cases, the driver or luminaire may have an expected end-of-life before the battery, and sometimes the other way around. In some cases, luminaires including a battery must be changed as a single unit.

Figure 15:
FIG. 15 is a method of predicting life expectancy of rechargeable battery according to an aspect.

FIG. 15 is directed to a method 1500 of predicting end of life expectancy of a rechargeable battery which is inbuilt within the luminaire and/or LED and acts as an emergency power source for an emergency lighting fixture. At step 1502, the system is configured to automatically switch off power to the plurality of luminaire and/or LED by software implementation and thereby initiate powering the luminaire/LED with the rechargeable battery. At step 1504, the rechargeable batteries in the respective emergency lighting fixture are checked to calculate end of life expectancy according to the exemplary techniques discussed herein. At step 1506, REST command is performed by a control system to turn OFF the plurality of luminaires and/or the plurality of LEDs. Step 1508 is representative of an exemplary parameter and goal of limiting the number of continual charge and discharge cycles of the rechargeable batteries and reducing stress on the rechargeable batteries to ensure maximum battery life. At step 1510, the duration test is performed to check the operation of the emergency luminaires and/or LEDs in emergency mode by allowing the system to change to emergency mode and discharge the rechargeable batteries. The result of the test is stored and can be returned to the control system when required. At step 1512, a function test is performed to check the status of the system and ensure that components such as the batteries, luminaires/LEDs, and circuitry are working correctly. The result of the test is stored and can be returned to the control system when required. At step 1514, an inhibit command is performed to stop the system with dimming control protocol from changing to emergency mode. The inhibit command will timeout at regular intervals, approximately after 15 minutes for safety, but is reset every time the inhibit command is received. At step 1516, at least two inbuilt calendars are provided to set the interval between successive duration and/or function tests. In the case of the system setting the duration, the test scheduling may be based on the rate of degradation observed in previous tests. At step 1518, luminaire and/or LED life counter command is performed to check if the luminaire and/or LED need replacement. At least two lamp status counters are present on the system, one counts normal lamp use whilst the other counts emergency lamp use. Lamp life counters for new lamp sources like LED and CCFL identify when light levels have fallen under 50%. At step 1520, prolonged time function command is performed to prolong the ability of the emergency luminaire and/or LED's emergency state via adjusting the dimming control of the luminaire. This time can be set from 0 to 60 minutes and can ensure that a safe lighting level is present after a short power failure. At step 1522, verifying whether the plurality of rechargeable batteries could be activated to power the plurality of luminaires and/or the plurality of LEDs to act as emergency lighting fixtures at the requisite light intensity for the requisite amount of time. The method is implemented in the luminaire, driver and battery DB 416 of FIG. 9.

Figure 10:
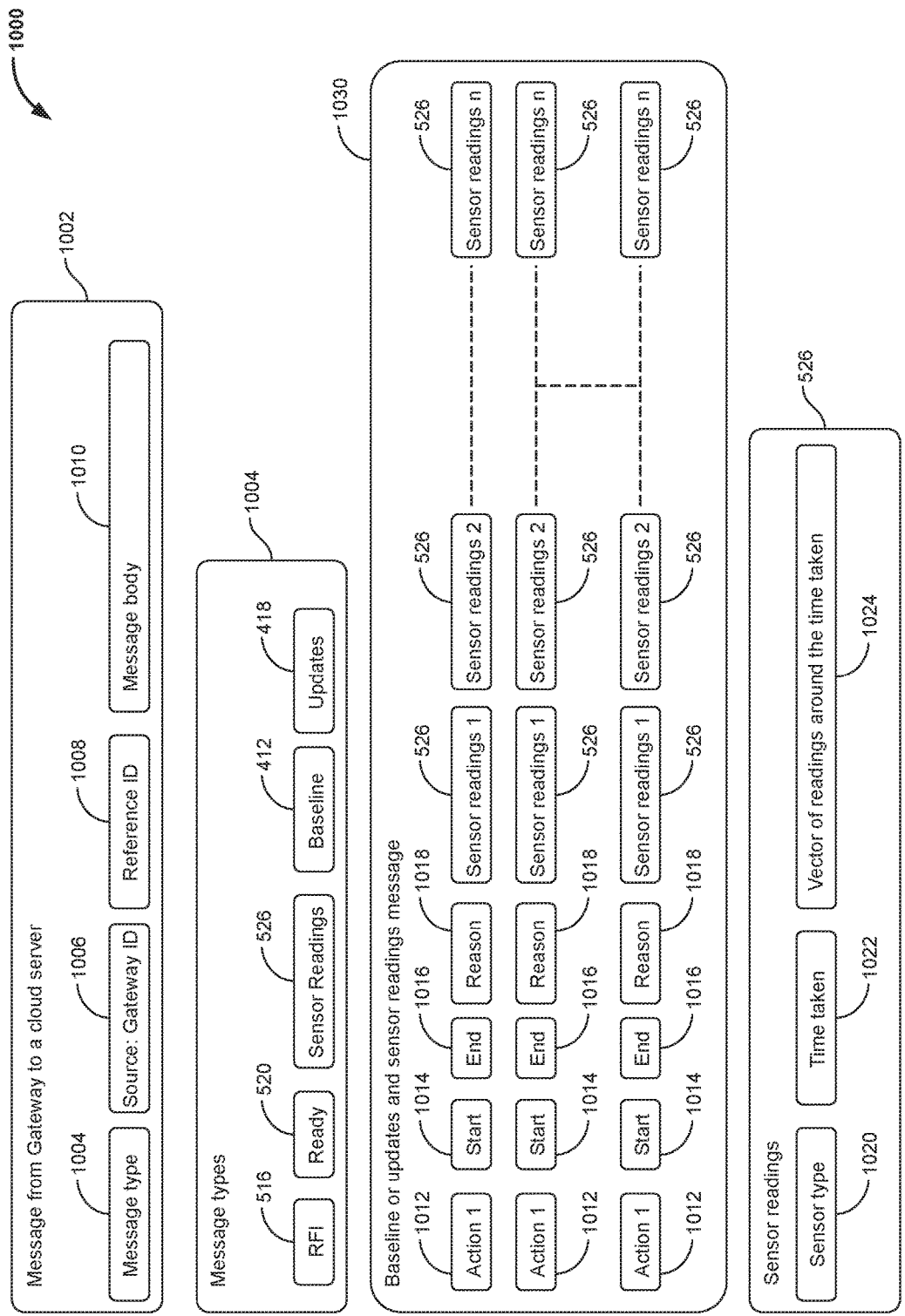
FIG. 10 is a diagram of a message structure for messages delivered from a gateway to cloud servers, according to an aspect.

FIG. 10 illustrates an embodiment 1000 of a message structure for messages delivered from the gateway 102 to the cloud servers 106. In an embodiment, the message 1002 from the gateway 102 to the cloud server 106 is a single structure message. The single structure message may include a Message type 1004, a sender gateway unique identification ("Source: gateway ID") 1006, a unique Reference ID 1008 and a Message body 1010. The Message type 1004 may inform the receiver about the type of the message being delivered. As used herein, the reference ID 1008, is an internal number that may be used when there is a conversation/message communication between the cloud servers 106 and the gateway 102. In an embodiment, the message body 1010 can be a baseline message or an updates message and it is structured the same in both cases. In an embodiment, the Message types 1004 includes a 'Request for Information' (RFI) 516, which is sent upon initialization of the luminaire, and a 'Ready' message 520 that is sent during initializations of the luminaire 112, after discovering the dimming protocol and when the gateway 102 is ready for further instructions. The Message types 1004 may include a Sensor readings message 526, which is sent to the cloud servers 106 during the initialization period. Additional Message types 1004 include the 'Baseline' message 412 and the 'Updates' message 418 message, which are used when sending baseline and updates messages, respectively, which are based on prior scheduled sensor readings by the gateway 102.

In an embodiment, the Baseline 412 or the Updates message 418 and the Sensor Readings message 526 is a 'Message body' 1030. The message structure of the Message body 1030 may be the same as the structures of the baseline 412 or updates 418 messages, and the sensor readings 526. For every 'action' 1012 included in the Message body 1030, such as, for example, a dimming level set, there is a 'Start' 1014 (an actual start time) and, an 'End' 1016 (an actual termination/end time), and a 'Reason' 1018 (why the action was terminated), and a plurality of sensor readings for all sensors participating in the action 1012. According to an aspect, the sensor readings may have been previously scheduled by the cloud server 106. The 'Reason' 1018 can be success or failure of the sensors, for multiple reasons.

The Sensor reading 526 part of the message may include a 'Sensor type' 1020 field to indicate which sensor reading is being communicated (such as, for example, TEMP, ALS, and RGB), a 'Time taken' 1022 field to indicate when the sensor reading was taken, and a 'Vector of readings' 1024, which includes multiple readings centered around the 'Time taken' 1022 field. In an embodiment, the number of readings can be based on the sensor type. According to an aspect, the number of readings taken is three, including shortly before, at, and shortly after the 'Time taken' 1022 field value.

Figure 11:
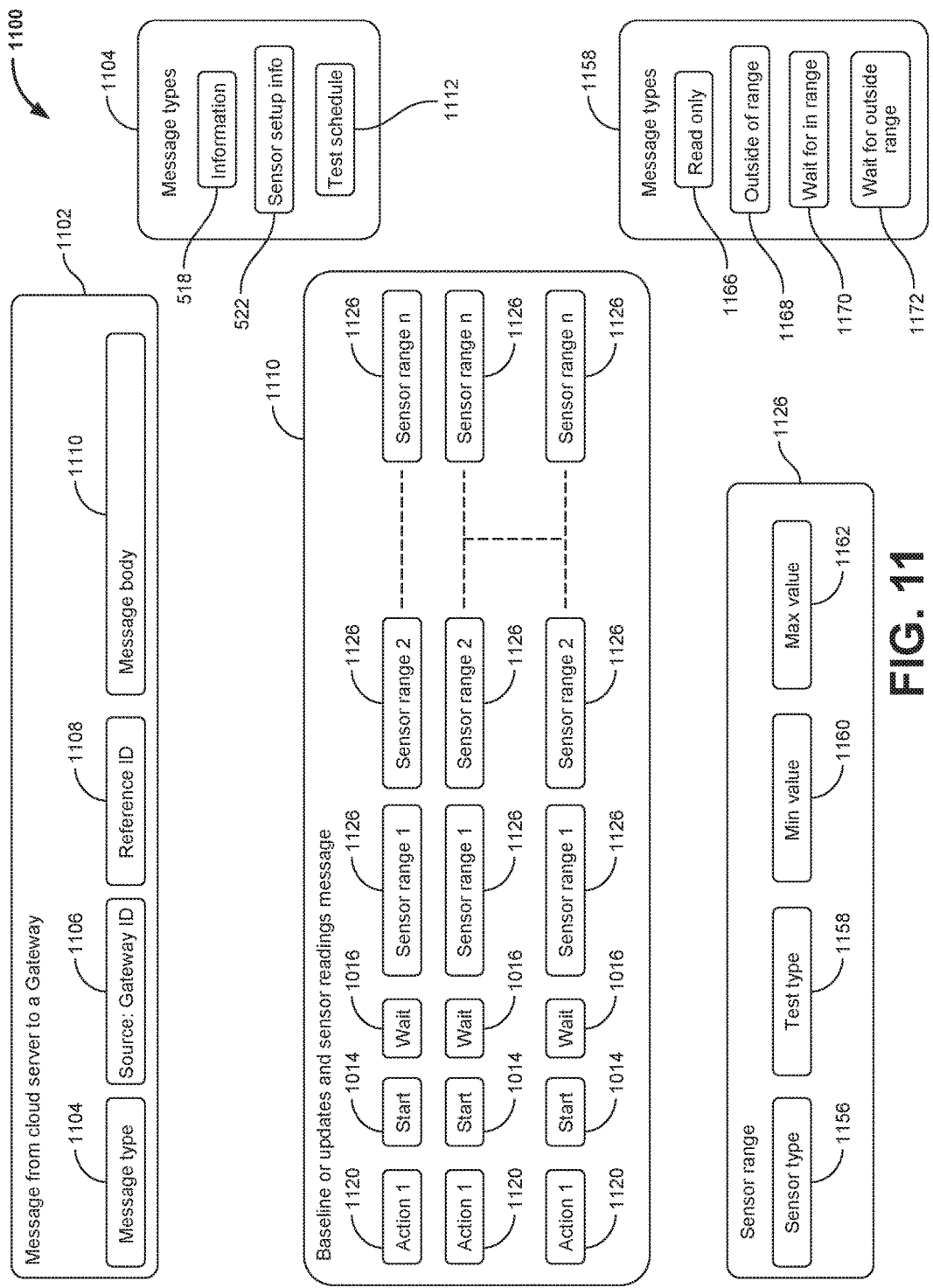
FIG. 11 is a diagram of a message structure for messages delivered from cloud servers to the gateway, according to an aspect.

FIG. 11 depicts an embodiment 1100 of the message structure for messages delivered from the cloud servers 106 to the gateway 102. The messages may be delivered by a UART 224 power meter interface including a transmitter and a receiver (not shown.) In an embodiment, the structure of the message 1102 is constant. The constant message structure may include a Message type 1104, a target gateway unique identification 1106, a unique Reference ID 1108 and a Message body 1110. The Message type 1104 may identify the type of message being transmitted/received and let the receiver know what kind of message it is. The unique reference ID 1108 is an internal number that maybe used when there is a conversation between the cloud servers 106 and the gateway 102. In an embodiment, the Message body 1110 is a Sensor Reading Schedule 528.

In an embodiment and as illustrated in FIG. 11, the Message types 1104 may include the 'Information' 518, the 'Sensor Setup Info' 522 and a 'Test Schedule' 1112. The 'Information' 518 may include the 'Sensor Setup Info' 522 messages, which provides the gateway 102 with information about valid ranges for sensor readings at different dimming levels. According to an aspect, the Message body 1110 is a 'Sensor Reading Schedule' 528. The Sensor Reading Schedule may provide/serve as a baseline for the gateway 102 in its internal measurement and initialization cycle. In an embodiment, the gateway 102 includes a default setup, which may be updated by the Sensor Reading Schedule 528. The 'Sensor Reading Schedule' 528 may include an 'Action' 1120 field, which may include the dimming level, a 'Start' 1122 field (the start time for the test), a 'Wait' 1124 field (the duration to wait before any measurement commences), followed by a list of sensors that are configured to participate in the measurements 1126. In an embodiment, the list of sensors, 'Sensor range n', is given as a list of Sensor ranges per sensor 1126.

In an embodiment, the Sensor range 1126 includes a 'Sensor Type' 1156 field, which identifies the sensor, and a 'Test Type' 1158 field, which informs/instructs the gateway 102 how to run the test. The Sensor range 1126 may further include a 'Min Value' 1160 field and a 'Max Value' 1162 field, each of which may provide the valid range for the sensor in this test. In an embodiment, the 'Test Type' 1158 directs/instructs the gateway 102 to handle different sensor values utilizing different methods/ways. These methods may include a 'Read Only' test 1166, an 'Outside of Range' test 1168, a 'Wait For in Range' test 1170, and a 'Wait for Outside Range' test 1172. In an embodiment, when the Test Type 1158 is the 'Read Only' test 1166, the value of the sensor is retrieved regardless of the sensor reading range. When the Test Type 1158 is the 'Outside of Range' test 1168, the value of the sensor is outside of the sensor reading range to be retrieved. When the Test Type 1158 is the 'Wait for in range' test 1170, the gateway 102 does not continue with other sensor readings/measurements until the specific sensor is in a desired/given range. In an embodiment, when the Test Type 1158 is the 'Wait for outside range' test 1172, the gateway 102 does not continue to read sensor values, until the sensor value is outside the given range.

Figure 12:
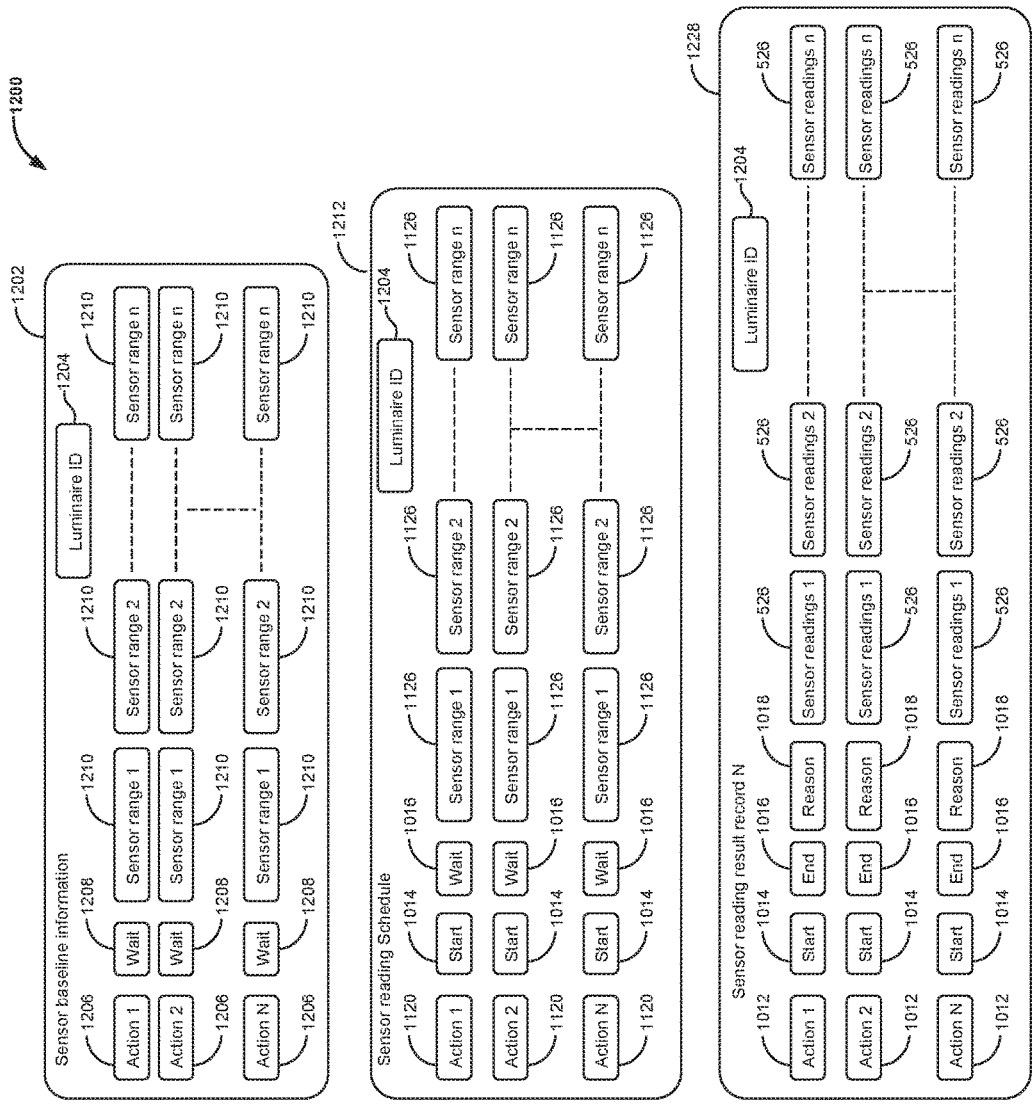
FIG. 12 is a diagram of a luminaire database structure, according to an aspect.

FIG. 12 illustrates as embodiment 1200 of the Luminaire Database structure. The Luminaire Database may include three types of records for every connected luminaire 112 in the system 100. In an embodiment, the records include a Sensor Baseline Information 1202, a Sensor Reading Schedule 1212 and a Sensor Reading Result Record 1228. In an embodiment, each luminaire 112 includes a single Sensor Baseline Information 1202 and a single Sensor Reading Schedule 1212 record. The Sensor Reading Result Record 1228 is illustrated in FIG. 12 by number ranges between 1 and N. This type of record may be added for each reading result, and may be kept/stored for as long as is needed, e.g., N can be very large.

In an embodiment, the Sensor Baseline Information 1202 includes sensor range information for all possible dimming levels that might be tested for the luminaire 112. The sensor range information may include a dimming action 1206, a minimal wait time 1208, and a list of sensor ranges. Each dimming action field 1206 may include the minimal Wait time 1208, which directs the gateway 102 to wait before taking sensor measurements, and a list of Sensor range fields 1210. According to an aspect, each sensor that needs to be monitored includes one list of Sensor range fields 1210. The sensors baseline information includes 1202 includes a Luminaire ID 1204 field, which identifies the luminaire 112 that this record belongs to.

According to an aspect, the Sensor Reading Schedule 1212 record is identical to the Sensor Reading Schedule 528, as described in detail hereinabove with reference to FIG. 11. The Sensor Reading Schedule 1212 may include one additional field, namely, the Luminaire ID 1204 field, which may be used to identify the luminaire 112 that the record belongs to. In an embodiment, the Sensor Reading Result Record 1228 is an accumulation of the Sensor Reading Message 1030 (see, for example, FIG. 10), except for one additional field—the Luminaire ID 1204 field. According to an aspect, each time the cloud server 106 receives a Sensor Reading Message 1030 that may be a Baseline message 412 or an Updates message 418, the cloud server 106 will store the message 412, 418 as a Sensor Reading Result Record 1228 for the specific luminaire 112.

Figure 13:
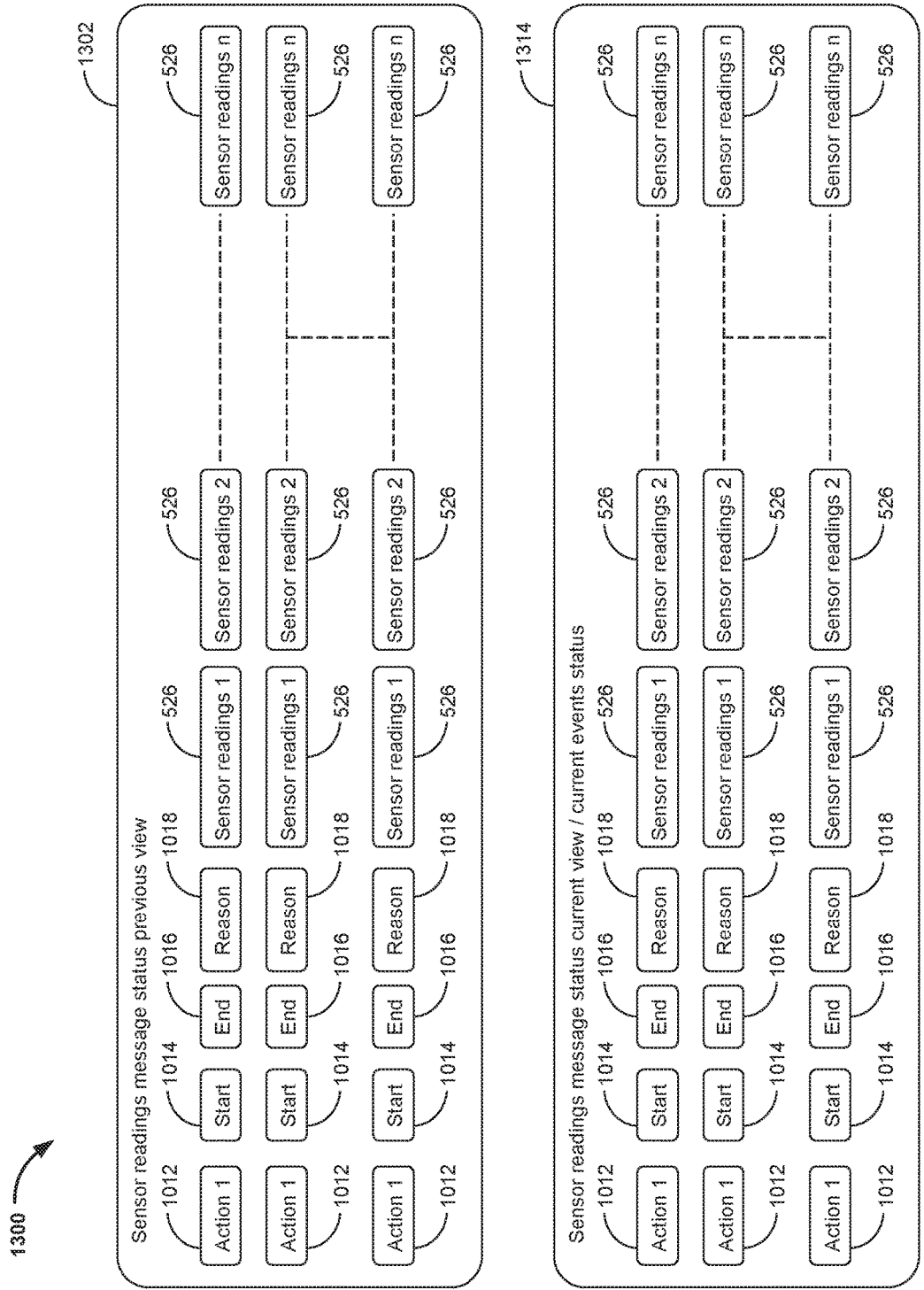
FIG. 13 is a diagram of an events database and message Status database structures, according to an aspect.

FIG. 13 illustrates an embodiment 1300 of the Events Database and the Message Status Database structures. In an embodiment and as described hereinabove with reference to FIG. 6, the Sensor Events DB 612 may be the same as the Message Status DB 618. According to an aspect, the Message Status DB 618 is an accumulation of all sensor events associated with the reporting of scheduled test results. The Sensor Events DB 612 may additionally be used to record events in real-time, such that the information is recorded into the appropriate structures for future messages to be generated. In an embodiment, the Message Status Database 618 contains two records. The first record is a Sensor Readings Message Status Previous View 1302, and the second record is the Sensor Readings Message Status Current View/Current Events Status 1314. When reading events are triggered, the appropriate fields in the Readings Message Status Current View/Current Events Status 1314 record are updated. The updates may occur in real time, that is, at the same time the reading events are triggered. When an Updates message is being sent or before a Baseline message is being sent, the content of the Sensor Readings Message Status Current View/Current Events Status 1314 is copied into the Sensor Readings Message Status Previous View 1302. When a Baseline message is being sent, the entire Sensor Readings Message Status Previous View 1302 record (FIG. 10) may be sent.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for predicting emergency lighting fixture life expectancy, comprising:
   a gateway configured to control illumination of a luminaire including an emergency power source;
   a sensor subsystem configured to measure data regarding at least light intensity of the luminaire and transmit the light intensity data to the gateway; and,
   a server configured to communicate data with the gateway,
   wherein the gateway is further configured to turn off or otherwise disconnect a main power supply to the luminaire and to initiate illumination of the luminaire via the emergency power source and thereby conduct a test to determine whether the emergency power source is capable of powering the luminaire at a requisite light intensity for a requisite duration during an emergency operation,
   the sensor subsystem is further configured to, as part of the test, measure either continuously or at certain intervals a measured light intensity of the luminaire during the test and transmit the data regarding the measured light intensity of the luminaire to the gateway,
   the gateway is further configured to transmit the data regarding the measured light intensity of the luminaire from the sensor subsystem to the server, and
   the server is configured to determine whether the emergency power source is capable of powering the luminaire at the requisite light intensity for the requisite duration during emergency operation, based at least in part on the data regarding the measured light intensity of the luminaire during the test.

2. The system of claim 1, wherein the emergency power source includes rechargeable batteries.

3. The system of claim 1, wherein
   the gateway is further configured to control at least one of a dimming level and dimming control protocol of the luminaire, and
   the server is further configured to calculate at least one of the dimming level and the dimming control protocol at which the emergency power source is capable of powering the luminaire at the requisite light intensity for the requisite duration during the emergency operation and instruct the gateway to adjust at least one of the dimming level and the dimming control protocol of the luminaire accordingly.

4. The system of claim 1, wherein the server is further configured to compare the data regarding the light intensity of the luminaire at different points in time during the test and calculate a predictive curve for life expectancy of the emergency power source during the emergency operation, based at least in part on the comparison.

5. The system of claim 1, wherein as part of the test the emergency power source is completely discharged and the sensor subsystem is configured to measure, either continuously or at certain intervals, a discharge light intensity of the luminaire during the entire discharge time of the emergency power source.

6. The system of claim 5, wherein the sensor subsystem is configured to measure and transmit to the server, via the gateway, data regarding the discharge light intensity of the luminaire during the entire discharge time of the emergency power source for two or more discharge tests of the emergency power source, and the server is further configured to calculate an end of life for the emergency power source based at least in part on a comparison of the data regarding the discharge light intensity of the luminaire during the entire discharge time of the emergency power source in the two or more discharge tests.

7. The system of claim 1, wherein the sensor subsystem includes one or more color sensors and one or more environment sensors.

8. The system of claim 7, wherein the one or more color sensors includes a Red Green Blue (RGB) sensor configured to measure a color intensity of the luminaire.

9. The system of claim 8, wherein the RGB sensor is configured to face the luminaire to measure color intensity of the luminaire.

10. The system of claim 7, wherein at least one environment sensor is configured to face away or in a downward direction from the luminaire and the one or more environment sensors are individually or collectively configured to measure environmental parameter data related to parameters of an environment in which the luminaire is installed, comprising at least one of temperature, humidity, ambient light, motion of light or objects through the environment, and footfall.

11. The system of claim 10, wherein the environmental parameter data includes the footfall and the server is configured to determine an emergency lighting fixture test schedule based at least in part on the footfall.

12. The system of claim 11, wherein the system is configured to stop the test if one of the at least one environment sensor detects the footfall during the test in the environment in which the luminaire is installed.

13. A method for predicting emergency lighting fixture life expectancy, comprising:
   cutting power to a luminaire having an emergency power source, via a gateway configured to control illumination of the luminaire, to initiate illumination of the luminaire via the emergency power source;

conducting a test to determine whether the emergency power source is capable of powering the luminaire at a requisite light intensity and for a requisite duration during an emergency operation;

measuring with a sensor subsystem, either continuously or at certain intervals as part of the test, a measured light intensity of the luminaire during the test;

transmitting data regarding the measured light intensity of the luminaire during the test from the sensor subsystem to a server, wherein the server is configured to communicate the data with the gateway; and, determining with the server whether the emergency power source is capable of powering the luminaire at the requisite light intensity for a requisite duration during the emergency operation based at least in part on the data regarding the measured light intensity of the luminaire during the test.

14. The method of claim 13, further comprising calculating, with the server at least one of a dimming level and a dimming control protocol for the luminaire at which the emergency power source is capable of powering the luminaire at the requisite light intensity for the requisite duration during the emergency operation and instructing the gateway to adjust at least one of the dimming level and the dimming control protocol of the luminaire accordingly.

15. The method of claim 13, further comprising comparing with the server the data regarding the measured light intensity of the luminaire at different points in time during the test and calculating with the server a predictive curve for life expectancy of the emergency power source during emergency operation, based at least in part on the comparison.

16. The method of claim 13, further comprising completely discharging the emergency power source as part of the test and measuring with the sensor subsystem, either continuously or at certain intervals, a light intensity of the luminaire during the entire discharge time of the emergency power source.

17. The method of claim 13, wherein the sensor subsystem includes one or more color sensors and one or more environment sensors.

18. The method of claim 17, wherein the one or more color sensors includes a Red Green Blue (RGB) sensor configured to face the luminaire and measure a color intensity of the luminaire.

19. The method of claim 17, wherein the at least one or more environment sensors is configured to face away or in a downward direction from the luminaire, the one or more environment sensors are individually or collectively configured to measure data related to parameters of an environment in which the luminaire is installed, including at least a footfall, and the method further comprises determining an emergency lighting fixture test schedule based at least in part on the footfall.

20. A system for predicting emergency lighting fixture life expectancy, comprising:

a gateway configured to control illumination of a luminaire including a light emitting diode (LED);

a dimming control configured to dim the luminaire;

an emergency power source;

a server configured to communicate data with the gateway;

a power meter configured to measure a power consumption by the luminaire during operation using a main power supply and transmit the power measurements from the operation using the main power supply to the server, via the gateway, in real-time; and a color sensor configured to face the luminaire directly to measure data regarding light intensity of the luminaire during operation using the main power supply and transmit the light intensity data from the operation using the main power supply to the server, via the gateway, wherein the gateway is further configured to turn off the main power supply to the luminaire and initiate illumination of the luminaire via the emergency power source, the power meter is further configured to measure data regarding power consumption during operation of the emergency power source and transmit the power consumption from the emergency power source data to the server, via the gateway, the color sensor is further configured to measure, either continuously or at certain intervals, light intensity of the luminaire during the operation of the emergency power source and transmit data regarding the light intensity from the emergency power source to the server, via the gateway, and the server is configured to correlate the light intensity data to the power consumption data for each of at least two respective operations of the emergency power source, compare the correlations to each other, and calculate an end of life for at least one of the emergency power source and the LED based at least in part on the comparison.

* * * * *